(12) United States Patent
Rigg et al.

(10) Patent No.: US 11,713,894 B2
(45) Date of Patent: Aug. 1, 2023

(54) CLIMATE CONTROL ADAPTIVE TEMPERATURE SETPOINT ADJUSTMENT SYSTEMS AND METHODS

(71) Applicant: Johnson Controls Technology Company, Auburn Hills, MI (US)

(72) Inventors: Brian D. Rigg, Douglass, KS (US); Shawn A. Hern, Park City, KS (US); Cody J. Kaiser, Wichita, KS (US); Noel A. Grajeda-Trevizo, Newton, KS (US); Tom R. Tasker, Andover, KS (US); Andrew M. Boyd, Wichita, KS (US)

(73) Assignee: Johnson Controls Tyco IP Holdings LLP, Milwaukee, WI (US)

( * ) Notice: Subject to any disclaimer, the term of this patent is extended or adjusted under 35 U.S.C. 154(b) by 87 days.

(21) Appl. No.: 17/093,479

(22) Filed: Nov. 9, 2020

(65) Prior Publication Data
US 2021/0055012 A1 Feb. 25, 2021

Related U.S. Application Data

(63) Continuation of application No. 16/047,680, filed on Jul. 27, 2018, now Pat. No. 10,830,476.
(Continued)

(51) Int. Cl.
*F24F 11/47* (2018.01)
*G05B 19/04* (2006.01)
(Continued)

(52) U.S. Cl.
CPC ............ *F24F 11/47* (2018.01); *F24F 11/523* (2018.01); *F24F 11/61* (2018.01); *F24F 11/64* (2018.01);
(Continued)

(58) Field of Classification Search
None
See application file for complete search history.

(56) References Cited

U.S. PATENT DOCUMENTS 8,457,796 B2  6/2013  Thind
8,543,244 B2  9/2013  Keeling et al.
(Continued)

FOREIGN PATENT DOCUMENTS

CA  2957726 A1  3/2016
CA  3043996 A1  2/2018
(Continued)

OTHER PUBLICATIONS

Dong et al., "Occupancy-Based HVAC Control with Short-Term Occupancy Prediction Algorithms for Energy-Efficient Buildings", Aug. 2018, Energies 2018, 11, 2427; doi:10.3390/en11092427. (Year: 2018).*
(Continued)

*Primary Examiner* — Mohammad Ali
*Assistant Examiner* — Kelvin Booker
(74) *Attorney, Agent, or Firm* — Fletcher Yoder, P.C.

(57) ABSTRACT

The present disclosure presents techniques for improving operational efficiency of climate control systems. A climate control system may include climate control equipment, a sensor that measures temperature in a building, and a control system that controls operation of the equipment using a first temperature schedule, which associates each time step with a temperature setpoint, when the building is occupied. When not occupied, the control system determines an expected return time based on historical occupancy data associated with the building, determines the temperature setpoint associated with the expected return time, determines candidate schedules each expected to result in the inside air temperature meeting the temperature setpoint, determines efficiency
(Continued)

metrics each associated with one of the candidates based on historical performance data resulting from previous operation of the climate control system, and controls operation of the equipment based on a second temperature schedule selected from the candidates based on associated efficiency metrics.

20 Claims, 10 Drawing Sheets

Related U.S. Application Data

(60) Provisional application No. 62/673,037, filed on May 17, 2018.

(51) Int. Cl.
| | |
|---|---|
| G05B 13/02 | (2006.01) |
| F24F 11/61 | (2018.01) |
| F24F 11/81 | (2018.01) |
| G05B 19/042 | (2006.01) |
| F24F 11/523 | (2018.01) |
| F24F 11/67 | (2018.01) |
| F24F 11/88 | (2018.01) |
| F24F 11/83 | (2018.01) |
| F24F 11/86 | (2018.01) |
| F24F 11/64 | (2018.01) |

(52) U.S. Cl.
CPC ............ F24F 11/67 (2018.01); F24F 11/81 (2018.01); F24F 11/83 (2018.01); F24F 11/86 (2018.01); F24F 11/88 (2018.01); G05B 13/021 (2013.01); G05B 13/026 (2013.01); G05B 19/0426 (2013.01); G05B 2219/2614 (2013.01)

(56) References Cited

U.S. PATENT DOCUMENTS

| | | | |
|---|---|---|---|
| 9,069,361 | B2 | 6/2015 | Merkulov et al. |
| 9,322,565 | B2 | 4/2016 | Weaver et al. |
| 9,447,985 | B2 | 9/2016 | Johnson |
| 9,535,411 | B2 | 1/2017 | Wei et al. |
| 9,582,009 | B2 | 2/2017 | Shahapurkar et al. |
| 9,595,070 | B2 | 3/2017 | Matsuoka et al. |
| 9,638,429 | B2 | 5/2017 | O'Hayer |
| 9,739,496 | B2* | 8/2017 | Seem .................. F24F 11/30 |
| 10,871,756 | B2 | 12/2020 | Johnson et al. |
| 10,908,578 | B2 | 2/2021 | Johnson et al. |
| 10,921,768 | B2 | 2/2021 | Johnson et al. |
| 11,156,978 | B2 | 10/2021 | Johnson et al. |
| 2005/0194455 | A1* | 9/2005 | Alles .................. F24F 13/10 236/1 R |
| 2010/0286937 | A1* | 11/2010 | Hedley .................. G06Q 50/06 702/60 |
| 2011/0112854 | A1 | 5/2011 | Koch et al. |
| 2014/0277761 | A1* | 9/2014 | Matsuoka .................. F24F 11/30 700/276 |
| 2015/0045964 | A1* | 2/2015 | Dempster ............ H04L 12/2803 700/276 |
| 2015/0051741 | A1* | 2/2015 | Bruck .................. F24F 11/46 700/276 |
| 2015/0167999 | A1* | 6/2015 | Seem .................. F24F 11/30 700/276 |
| 2015/0168003 | A1 | 6/2015 | Stefanski et al. |
| 2015/0330652 | A1 | 11/2015 | Kim |
| 2016/0103462 | A1 | 4/2016 | Ainsley et al. |
| 2016/0123618 | A1 | 5/2016 | Hester et al. |
| 2016/0123619 | A1 | 5/2016 | Hester et al. |
| 2016/0146497 | A1 | 5/2016 | Chapman et al. |
| 2016/0223215 | A1* | 8/2016 | Buda .................. G05D 23/1917 |
| 2016/0305678 | A1* | 10/2016 | Pavlovski .................. F24F 11/30 |
| 2017/0102158 | A1 | 4/2017 | Chandan et al. |
| 2017/0212482 | A1* | 7/2017 | Boettcher .......... H02J 13/00002 |
| 2018/0005195 | A1 | 1/2018 | Jacobson |
| 2018/0031262 | A1* | 2/2018 | Atchison .................. F24F 11/65 |
| 2019/0279324 | A1 | 9/2019 | Koch et al. |

FOREIGN PATENT DOCUMENTS

| | | | |
|---|---|---|---|
| EP | 2857921 | A1 | 4/2015 |
| EP | 3 186 687 | A4 | 7/2017 |
| EP | 3 497 377 | A1 | 6/2019 |

OTHER PUBLICATIONS

Erickson et al.,"POEM: Power-efficient Occupancy-based Energy Management System", Apr. 2013, IPSN'13, Apr. 8-11, 2013, Philadelphia, Pennsylvania, USA.. (Year: 2013).*

Peng et al., "Using machine learning techniques for occupancy-prediction-based cooling control in office buildings", Jul. 2017, Applied Energy 211 (2018) 1343-1358. (Year: 2017).*

Peng et al., "Occupancy learning-based demand-driven cooling control for office spaces", Mar. 2017, Building and Environment 122 (2017). (Year: 2017).*

Yang, Z. and Becerik-Gerber, B., "The Coupled Effects of Personalized Occupancy Profile Based HVAC Schedules and Room Reassignment on Building Energy Use", Science Direct—Energy and Buildings 78, 2014, pp. 113-122.

Nikovski, D., Xu, J., and Nonaka, M., "A Method for Computing Optimal Set-Point Schedule for HVAC Systems", Mitsubishi Electric Research Laboratories, Jun. 2013, 12 pgs, Cambridge, Massachusetts.

Nghiem, T and Pappas, G, "Receding-Horizon Supervisory Control of Green Buildings", American Control Conference, 2011, pp. 4416-4420.

Korkas,C., Baldi, S., Michailidis, I., and Kosmatopoulos, E. "Occupancy-Based Demand Response and Thermal Comfort Optimization in Microgrids with Renewable Energy Sources and Energy Storage", Science Direct—Applied Energy 163, 2015, pp. 93-104.

Kang, S.J; Park, J; Oh, K.-Y; Noh, JG; and Park, H, "Scheduling-Based Real Time Energy Flow Control Strategy for Building Energy Management System", Science Direct—Energy and Buildings 75, 2014, pp. 239-248.

Dong, B.; Lam, K.P.; and Neuman, C.P, "Integrated Building Control Based on Occupant Behavior Pattern Detection and Local Weather Forecasting", Proceedings of Building Simulation 2011: 12th Conference of International Building Performance Simulation Association, Nov. 2011, pp. 193-200.

Dong, B; Lam, K.P, "A Real Time Model Predictive Control for Building Heating and Cooling Systems Based on the Occupancy Behavior Pattern Detection and Local Weather Forecasting", Building Simulation, vol. 7, No. 1, 2014, pp. 89-106.

Dobbs, J.R; and Hencey, B.M., "Model Predictive HVAC Control with Online Occupancy Model", Science Direct—Energy and Buildings 82, 2014, pp. 675-684.

Alvarez, J.D.; Redondo, J.L.; Camponogara, E.; Normey_Rico, J.; Berenguel, M. and Ortigosa, P.M., "Optimizing Building Comfort Temperature Regulation via Model Predictive Control", Science Direct—Energy and Buildings 57, 2012, pp. 361-372.

CoolingLogic, "CoolingLogic: Up early, saving billions." URL: http://coolinglogic.com/documents/MarketingFlyer_FINAL_HiRes8.5x11.pdf, retrieved from internet Oct. 27, 2022 (1 page).

Incomplete File of Communication with Various Companies, etc. in 2016-2021, URL: http://coolinglogic.com/documents/22072101_Letters_and_Signature_Receipts.pdf, published, as one document, on: Jul. 21, 2022 (211 pages).

Johnson Heating and Cooling L.L.C., "Divine Grace Building Automation (Images)," URL: http://cooljohnson.com/Building-Automation-Systems-Michigan/Oakland-County-Michigan/Building-Automation-Images.html, retrieved from internet Oct. 27, 2022 (8 pages).

Johnson Heating and Cooling L.L.C., "Divine Grace Building Automation," URL: http://cooljohnson.com/Building-Automation-Systems-Michigan/Oakland-County-Michigan/Building-Automation-

(56) References Cited

OTHER PUBLICATIONS

Divine-Grace.html, retrieved from internet Oct. 27, 2022 (3 pages).
Johnson Heating and Cooling L.L.C., "Excel Rehabilitation Building Automation," URL: http://cooljohnson.com/Building-Automation-Systems-Michigan/Waterford-Michigan/Building-Automation-System--Excel.html, retrieved from internet Oct. 27, 2022 (2 pages).
Johnson Heating and Cooling L.L.C., "Intertek Testing Services Building Automation," URL: http://cooljohnson.com/Building-Automation-Systems-Michigan/Plymouth-Michigan/Building-Automation-System-Plymouth-Michigan.html, retrieved from internet Oct. 27, 2022 (8 pages).
Johnson Heating and Cooling L.L.C., "JLA Medical Building Building Automation," URL: http://cooljohnson.com/Building-Automation-Systems-Michigan/Waterford-Michigan/Building-Automation-System--JLA.html, retrieved from internet Oct. 27, 2022 (3 pages).
Johnson Heating and Cooling L.L.C., "Mosaic Christian Building Automation (Images)," URL: http://cooljohnson.com/Building-Automation-Systems-Michigan/Detroit/Building-Automation-Images.html, retrieved from internet Oct. 27, 2022 (12 pages).
Johnson Heating and Cooling L.L.C., "Mosaic Christian Building Automation," URL: http://cooljohnson.com/Building-Automation-Systems-Michigan/Detroit/Mosaic-Christian.html, retrieved from internet Oct. 27, 2022 (5 pages).
Johnson Heating and Cooling L.L.C., "Shepherd's Gate Lutheran Church Building Automation," URL: http://cooljohnson.com/Building-Automation-Systems-Michigan/Shelby-Township-Michigan/Building-Automation-Systems-SG.html, retrieved from internet Oct. 27, 2022 (3 pages).
Johnson Heating and Cooling L.L.C., "St. Clair County Residence Building Automation," URL: http://cooljohnson.com/Building-Automation-Systems-Michigan/St-Clair-Michigan/Building-Automation-System-St-Clair-Michigan.html, retrieved from internet Oct. 27, 2022 (4 pages).
Johnson Heating and Cooling L.L.C., "St. Joseph Mercy Oakland U. C. Building Automation," URL: http://cooljohnson.com/Building-Automation-Systems-Michigan/Waterford-Michigan/Building-Automation-Systems-SJMO.html, retrieved from internet Oct. 27, 2022 (2 pages).
Johnson Heating and Cooling L.L.C., "Waterford Internal Medicine Building Automation," URL: http://cooljohnson.com/Building-Automation-Systems-Michigan/Waterford-Michigan/Building-Automation-Systems-WIM.html, retrieved from internet Oct. 27, 2022 (3 pages).
Johnson Heating and Cooling, LLC, "Building Automation Clawson Michigan 2.0," URL: http://cooljohnson.com/Building-Automation-Systems-Michigan/Clawson-Michigan/Building-Automation-Clawson-Manor-2.html, retrieved from the internet Oct. 27, 2022 (6 pages).
Johnson Heating and Cooling, LLC, "Building Automation Images Clawson Michigan 2.0," URL: http://cooljohnson.com/Building-Automation-Systems-Michigan/Clawson-Michigan/Building-Automation-Clawson-Manor-2-Images.html, retrieved from the internet Oct. 27, 2022 (14 pages).
Johnson Heating and Cooling, LLC, "Building Automation System Clawson Michigan Clawson Manor," URL: http://cooljohnson.com/Building-Automation-Systems-Michigan/Clawson-Michigan/Building-Automation-System-Clawson-Manor.html; retrieved from the internet Oct. 27, 2022 (3 pages).
Johnson Heating and Cooling, LLC, "Building Automation System in Michigan Images," URL: http://cooljohnson.com/Building-Automation-Systems-Michigan/Macomb-County-Michigan/Building-Automation-Images.html; retrieved from the internet Oct. 27, 2022 (13 pages).
Johnson Heating and Cooling, LLC, "Building Automation System in Michigan," URL: http://cooljohnson.com/Building-Automation-Systems-Michigan/Macomb-County-Michigan/Building-Automation-Confidential-Customer.html; retrieved from the internet, Oct. 27, 2022 (4 pages).
Johnson Solid State LLC, "Building Automation Equipment," URL: http://cooljohnson.com/Video/Building_Automation/Confidential_Customer_BLD_2/Building_Automation_Equipment.mp4, retrieved from internet Oct. 27, 2022 (35 pages).
Johnson Solid State LLC, "Building Automation GUI," URL: http://cooljohnson.com/Video/Building_Automation/Confidential_Customer_BLD_2/Building_Automation_GUI.mp4, retrieved from internet Oct. 27, 2022 (24 pages).
Johnson Solid State LLC, "Cooling Logic Overview," URL: http://coolinglogic.com/documents/CoolingLogic_Overview_High_Quality.mp4, retrieved from internet Oct. 27, 2022 (16 pages).
Johnson Solid State LLC, "So what is CoolingLogic™?" URL: http://coolinglogic.com/Coolinglogic-How-it-Works.html, retrieved from the internet Oct. 27, 2022 (3 pages).
Johnson, David, "A Method to Increase HVAC System Efficiency and Decrease Energy Consumption," White Paper: Johnson Solid State, LLC, URL: http://coolinglogic.com/documents/16102106_White_Paper_High_Resolution_Protected.pdf, Sep. 24, 2016 (51 pages).
Johnson, David, "CoolingLogic™: Mosaic Christian Church a Case Study," Report: Johnson Solid State, LLC, URL: http://coolinglogic.com/documents/19020301_Mosaic_Christian_Coolinglogic_Case_Study.pdf, Feb. 2, 2019 (140 pages).
Johnson, David, "Excel Rehabilitation Building Automation: Building Automation System User Manual ," URL: http://cooljohnson.com/Building-Automation-Systems-Michigan/Waterford-Michigan/Building-Automation-System-Excel-Manual.html, 2012 (10 pages).
Johnson, David, "Temperature Control System and Methods for Operating Same," Pre-Publication printout of U.S. Appl. No. 15/231,943, filed Aug. 9, 2016, URL: http://coolinglogic.com/documents/16080901_CIP_As_Filed.pdf (99 pages).
Johnson, David., "CoolingLogic™: Changing the Way You Cool," Report: Johnson Solid State, LLC, URL: http://coolinglogic.com/documents/18111303_Changing_the_way_you_Cool.pdf, Nov. 7, 2018 (12 pages).

\* cited by examiner

HISTORICAL PERFORMANCE DATA

| | ENV TEMP | ENV HUM | START TEMP | END TEMP | DURATION | EQUIP MODE | ENERGY USAGE |
|---|---|---|---|---|---|---|---|
| 144 | 80°F | 20% | 80°F | 60°F | 30 MIN | Y2 | 30kWh |
| 146 | 80°F | 20% | 80°F | 75°F | 7.5 MIN | Y2 | 8kWh |
| 148 | 80°F | 20% | 80°F | 75°F | 30 MIN | Y1 | 10kWh |
| 150 | 80°F | 20% | 60°F | 63°F | 60 MIN | OFF | 0kWh |
| 152 | 80°F | 20% | 65°F | 67°F | 60 MIN | OFF | 0kWh |
| 154 | 80°F | 20% | 70°F | 71°F | 60 MIN | OFF | 0kWh |
| 156 | 80°F | 20% | 74°F | 75°F | 60 MIN | OFF | 0kWh |

| DATE | DAY OF WEEK | HISTORICAL OCCUPANCY DATA ||||
| | | LEAVE TIME | RETURN TIME | LEAVE TIME | RETURN TIME |
|---|---|---|---|---|---|
| DAY 1 | F | 7:58AM | 4:55PM | NA | NA |
| DAY 2 | Sa | 11:33AM | 1:45PM | 6:15PM | 9:22PM |
| ... | | | ... | | |
| DAY N-1 | Th | 8:07AM | 5:20PM | NA | NA |
| DAY N | F | 7:55AM | 4:45PM | NA | NA |
| | | | ... | | |

136 → DAY 1
138 → DAY 2
140 → DAY N-1
142 → DAY N

FIG. 7

CLIMATE CONTROL ADAPTIVE TEMPERATURE SETPOINT ADJUSTMENT SYSTEMS AND METHODS

CROSS-REFERENCE TO RELATED APPLICATION

This application is a continuation of U.S. patent application Ser. No. 16/047,680, entitled "CLIMATE CONTROL ADAPTIVE TEMPERATURE SETPOINT ADJUSTMENT SYSTEMS AND METHODS," filed Jul. 27, 2018, which claims priority to and the benefit of U.S. Provisional Patent Application No. 62/673,037, entitled "HVAC ADAPTIVE TEMPERATURE SETPOINT ADJUSTMENT SYSTEMS AND METHODS," filed May 17, 2018, each of which is hereby incorporated by reference in its entirety for all purposes.

BACKGROUND

The present disclosure generally relates generally to climate control systems, such as system, and, more particularly, to adaptive or dynamic adjustment of temperature setpoints implemented in a climate control system.

This section is intended to introduce aspects of art that may be related to the techniques of the present disclosure, which are described and/or claimed below. This discussion is believed to be helpful in providing background information to facilitate a better understanding of the present disclosure. Accordingly, it should be understood that this section should be read in this light and not as an admission of prior art.

A climate control system, such as a heating, ventilation, and air conditioning (HVAC) system, is often deployed in a building to facilitate controlling air conditions, such as temperature and/or humidity, within the building. For example, a heating, ventilation, and air conditioning (HVAC) system may include climate control equipment, such as an HVAC unit, which operates to produce temperature-controlled air that is circulated through internal spaces of the building. To facilitate controlling the air conditions within a building, the climate control system may control operation of its climate control equipment based at least in part on a temperature setpoint or a target temperature associated with the internal space. For example, when measured temperature within the internal space is greater than the temperature setpoint by more than a threshold, the HVAC system may turn on or run the HVAC unit to extract heat from air to be provided to the internal space to facilitate cooling the internal space.

However, running climate control equipment, such as an HVAC unit and/or a furnace, generally consumes energy resources, such as electrical power received from an electrical grid and/or natural gas received from a gas pipeline. Additionally, at least in some instances, energy consumption of climate control equipment may vary based on the temperature setpoint as well as other factors, such as building characteristics, deployment configuration of the climate control system, environmental conditions, initial air conditions within the building, and/or the like. For example, when environmental or outside air temperature is higher than the temperature setpoint, increasing the temperature setpoint may facilitate reducing operating or runtime duration of the HVAC unit and, thus, energy consumption of the HVAC system. In fact, in some instances, a temperature setpoint associated with a building may be overly stringent or constraining, for example, when the building is unoccupied and, thus, affect operational efficiency of the climate control system.

SUMMARY

This section provides a brief summary of certain embodiments described in the present disclosure to facilitate a better understanding of the present disclosure. Accordingly, it should be understood that this section should be read in this light and not to limit the scope of the present disclosure. Indeed, the present disclosure may encompass a variety of aspects not summarized in this section.

In one embodiment, a climate control system includes climate control equipment that produces temperature-controlled air to be supplied to a building serviced by the climate control system, an indoor temperature sensor that measures inside air temperature of the building, and a control system communicatively coupled to the climate control equipment and the indoor temperature sensor. The control system controls operation of the climate control equipment based at least in part on a first temperature schedule that associates each time step during a first control horizon of the first temperature schedule with a first temperature setpoint when the building is occupied. When the building is not occupied, the control system determines an expected return time of an occupant to the building based at least in part on historical occupancy data associated with the building, determines the first temperature setpoint associated with the expected return time by the first temperature schedule, determines a plurality of candidate schedules each expected to result in the inside air temperature of the building meeting the first temperature setpoint associated with the expected return time when the expected return time is reached, determines a plurality of efficiency metrics each associated with one of the plurality of candidate schedules based at least in part on energy usage indicated by historical performance data resulting from previous operation of the climate control system while deployed in the building, and controls operation of the climate control equipment based at least in part on a second temperature schedule selected from the plurality of candidate schedules based on the plurality of efficiency metrics.

In another embodiment, a method for controlling operation of a heating, ventilation, and air conditioning (HVAC) system includes determining, using a control system implemented in the HVAC system, whether a building serviced by the HVAC system is currently occupied and, when the building is not currently occupied, determining, using the control system, an expected return time of an occupant to the building based at least in part on historical occupancy data associated with the building, determining, using the control system, a target temperature expected to be present in the building at the expected return time; determining, using the control system, a plurality of candidate schedules each expected to result in inside air temperature of the building meeting the target temperature at the expected return time; determining, using the control system, a plurality of efficiency metrics each associated with one of the plurality of candidate schedules based at least in part on energy usage indicated by historical performance data resulting from previous operation of the HVAC system while deployed in the building; and controlling, using the control system, operation of an HVAC unit implemented in the HVAC system based at least in part on an setback temperature schedule selected from the plurality of candidate schedules based on the plurality of efficiency metrics to facilitate supplying the building temperature-controlled air.

In another embodiment, a tangible, non-transitory, computer-readable medium stores instructions executable by at least one processor of a control system. The instructions includes instructions to control, using the at least one processor, operation of a climate control system based at least in part on a first temperature schedule during a first control horizon to facilitate supplying temperature-controlled air to a building, determine, using the at least one processor, occupancy status of the building over the first control horizon, and determine, using the at least one processor, performance data resulting from operation of the climate control system during the first control horizon that associates environmental conditions, operational parameters of the climate control system, resulting change in indoor temperature of the building, and energy usage resulting from operating the climate control system. When the building is unoccupied during a second control horizon after the first control horizon, the instructions include instructions to determine, using the at least one processor, an expected return time of an occupant to the building based at least in part on the occupancy status of the building over the first control horizon, determine, using the at least one processor, a target temperature expected to be present in the building at the expected return time, determine, using the at least one processor, a plurality of candidate schedules each expected to result in the indoor temperature of the building meeting the target temperature at the expected return time, determine, using the at least one processor, a plurality of efficiency metrics each associated with one of the plurality of candidate schedules based at least in part on the performance data resulting from operation of the climate control system during the first control horizon; and control, using the at least one processor, operation of the climate control system during the second control horizon based at least in part on a second temperature schedule selected from the plurality of candidate schedules based on the plurality of efficiency metrics

BRIEF DESCRIPTION OF THE DRAWINGS

Various aspects of the present disclosure may be better understood upon reading the detailed description and upon reference to the drawings, in which:

FIG. 6 is a diagrammatic representation of example historical occupancy data associated with the building of FIG. 1, in accordance with an embodiment of the present disclosure;

FIG. 7 is a diagrammatic representation of example historical performance data associated with the HVAC system of FIG. 1, in accordance with an embodiment of the present disclosure;

DETAILED DESCRIPTION

Figure 1:
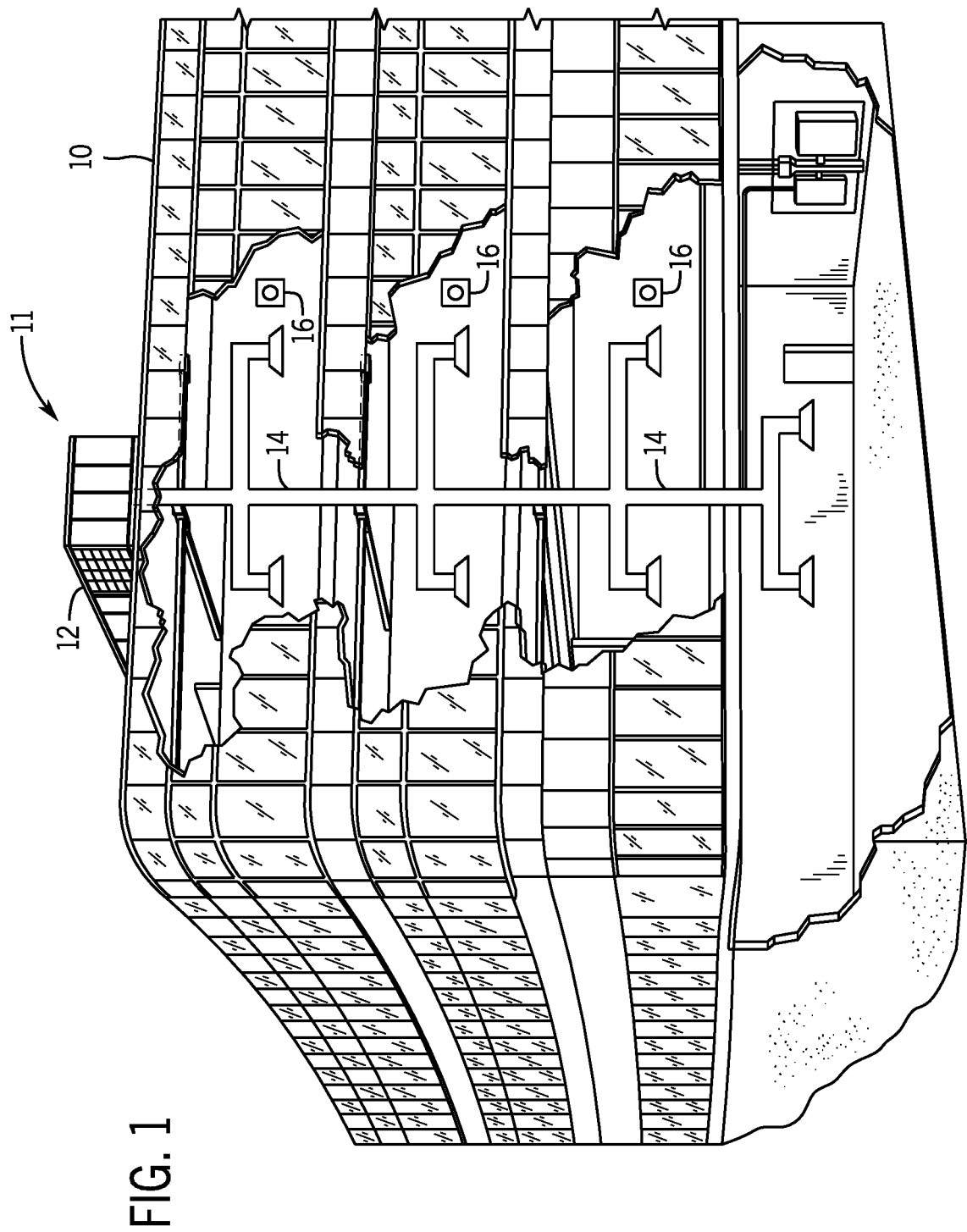
FIG. 1 is a partial cross-sectional view of a building that includes a heating, ventilating, and air conditioning (HVAC), in accordance with an embodiment of the present disclosure.

One or more specific embodiments of the present disclosure will be described below. These described embodiments are only examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but may nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

Generally, a climate control system, such as a heating, ventilation, and air conditioning (HVAC) system, may operate to facilitate controlling air conditions or parameters, such as temperature and/or humidity, present within a building. To facilitate controlling the air conditions, a climate control system include climate control equipment that operates to supply temperature-controlled air to internal spaces within the building. For example, the climate control equipment may include an HVAC unit that, during operation or while running, actuates a compressor to circulate refrigerant that extracts heat from input air, thereby producing cooled air that may be supplied to the internal space. Additionally or alternatively, the climate control equipment may include a furnace that, during operation or while running, combusts fuel to inject heat into input air, thereby producing heated air that may be supplied to the internal space.

To control operation of its equipment, a climate control system may include a control system, for example, implemented via one or more thermostats or controllers. In particular, the control system may control operation of climate control equipment based at least in part on target air conditions or parameters, such as a target humidity level, a target temperature, or a temperature setpoint. For example, when difference between measured temperature within a building and a temperature setpoint associated with the building is less than a threshold, the control system may instruct the HVAC system to turn off or maintain off the HVAC unit. On the other hand, when difference between the measured temperature and the temperature setpoint is not less than the threshold, the control system may instruct the HVAC system to turn on or run the HVAC unit.

However, running or operating climate control equipment generally consumes energy resources. For example, an HVAC unit may include electromechanical components, such as a motor, coupled to its compressor. As such, while running, the HVAC unit may consume electrical energy to actuate its compressor. Additionally or alternatively, while running, a furnace may combust fuel, such as natural gas, and, thus, consume energy resources.

In some instances, energy consumption resulting from operation of climate control equipment may be dependent on various factors, such as target air conditions, building characteristics, deployment configuration of the climate control system, environmental conditions, initial air conditions within the building, and/or the like. For example, deploying the HVAC system in a larger building may result in the HVAC equipment running longer and/or at a higher conditioning stage, which, at least in some instances, may result in increased energy consumption compared to deployment in a smaller building. Additionally or alternatively, adjusting a temperature setpoint farther from the environmental or outside air temperature may result in the HVAC equipment running longer and/or at a higher conditioning stage, which, at least in some instances, may result in increased energy consumption.

Furthermore, in some instances, target air conditions over a control horizon may be indicated via an air condition schedule. For example, a temperature schedule may indicate a temperature setpoint associated with each one hour time step during a day or any other suitable control horizon. In some instances, a climate control system may be programmed with a default or base air condition schedule, for example, input to its control system by a manufacturer or a user, such as a homeowner or a technician. For example, the default air condition schedule may indicate a constant 75° F. temperature setpoint. However, at least in some instances, one or more target air conditions indicated by a default air condition schedule may be overly stringent, for example, when the building is unoccupied. In other words, in such instances, operating the climate control system using the default air condition schedule may affect operation associated cost, such as energy consumption, maintenance frequency, resulting disturbances, and/or life span of the climate control system.

Accordingly, the present disclosure provides techniques to facilitate reducing operation associated cost by dynamically or adaptively adjusting an air condition schedule implemented by an climate control system, for example, based at least in part on historical data associated with previous operation of the climate control system and/or future conditions expected to occur during at least a portion of the control horizon of the air condition schedule. In some embodiments, the historical data may include historical performance data that associates operational parameters of climate control equipment, such as runtime duration and/or energy usage, during previous operation of the climate control system with building air conditions and environmental conditions, such as outside air temperature and/or outside air humidity, present during the previous operation.

For example, historical performance data may indicate that running the HVAC unit in stage-one cooling for thirty minutes when the environmental temperature was 80° F. and the environmental humidity level was 20% reduced measured or inside air temperature from 80° F. to 75° F. and consumed 10 kWh of electrical energy. Additionally, the historical performance data may indicate that maintaining the HVAC unit off for one hour when the environmental temperature was 80° F. and the environmental humidity level was 20% resulted in the inside air temperature increasing from 74° F. to 75° F. Furthermore, the historical performance data may indicate that maintaining the HVAC unit off for an hour when the environmental temperature was 80° F. and the environmental humidity level was 20% resulted in the inside air temperature increasing from 60° F. to 63° F., from 65° F. to 67° F., from 70° F. to 71° F., or from 74° F. to 75° F.

Additionally or alternatively, the historical data may include historical occupancy data, for example, which indicates when the building was unoccupied during previous operation of the climate control system. For example, the historical occupancy data may indicate that a homeowner left home at 7:58 AM and returned home at 4:55 PM on a previous day. Additionally, the historical occupancy data may indicate that a homeowner left home at 7:55 AM and returned home at 4:45 PM on another previous day.

Thus, in some embodiments, the control system may determine or predict future conditions, such as an occupancy schedule for a building, based at least in part on historical data associated with a climate control system that services the building. For example, based at least in part on the historical occupancy data associated with the previous day and the other previous day, the control system may determine that the expected return time for a current day is around 5:00 PM. Additionally or alternatively, the control system may determine expected future conditions based at least in part on data received from an external source. For example, the control system may determine expected price per unit of energy and/or expected carbon footprint resulting from production of a unit of energy based at least in part on cost data received from a utility provider. Additionally or alternatively, the control system may determine environmental temperature and/or humidity expected to be present during subsequent operation of the climate control system based at least in part on weather data or forecast data received from a database or server communicatively coupled to the control system via a communication network.

Moreover, based at least in part on the historical performance data, the control system may determine or predict performance of the climate control system expected to result when the expected environmental conditions occur. For example, when the expected environmental temperature is 80° F. and the expected environmental humidity level is 20%, the control system may predict that running the HVAC unit with stage-one cooling for thirty minutes will reduce inside air temperature from 80° F. to 75° F. and consume 10 kWh of electrical energy. Similarly, the control system may predict that running the HVAC unit with stage-two cooling for thirty minutes will reduce inside air temperature from 80° F. to 60° F. and consume 30 kWh of electrical energy. In other words, the control system may predict that running the HVAC unit in stage-one cooling is able to reduce temperature within the building by approximately 10° F. per hour and running the HVAC unit in stage-two cooling is able to reduce temperature within the building by approximately 40° F. per hour.

Furthermore, when the expected environmental temperature is 80° F. and the expected environmental humidity level is 20%, the control system may predict that maintaining the HVAC unit off for an hour will increase inside air temperature from 60° F. to 63° F. Similarly, the control system may predict that maintaining the HVAC unit for an hour will increase inside air temperature from 65° F. to 67° F., from 70° F. to 71° F., or from 74° F. to 75° F. In other words, the control system may predict that temperature retention of the building is expected to result in temperature increasing by approximately 1-3° F. per hour when the HVAC unit is off.

Moreover, based at least in part on the predicted performance, the control system may determine one or more candidate air condition schedules expected to result in the target air conditions indicated at the expected return time by the default air condition schedule. For example, when the predicted performance indicates that running the HVAC unit is able to reduce inside air temperature by approximately 10° F. per hour, the control system may determine a first candidate temperature schedule with a temperature setpoint that is 85° F. between 8:00 AM-4:00 PM, gradually decreases from 85° F. to 75° F. between 4:00-5:00 PM, and, thus, is expected to result in air temperature within the building being approximately 75° F. at the expected return time. Additionally or alternatively, when the predicted performance indicates that running the HVAC unit is able to reduce inside air temperature by approximately 40° F. per hour and the temperature retention of the building increases inside air temperature by approximately 1-3° F. per hour, the control system may determine a second candidate temperature schedule with a temperature setpoint that gradually decreases (e.g., ramps) from 80° F. to 65° F. between 8:00-9:30 AM and is a maximum inside air temperature between 8:30 AM-5:00 PM. Relying on the temperature retention of the building, implementing the second candidate temperature schedule may nevertheless result in the inside air conditions being approximately 75° F. at the expected return time.

To facilitate improving operational efficiency, when the building is unoccupied, the control system may override or adjust at least a portion of the default air condition schedule. For example, the control system may override a portion of the default air condition schedule with an adjusted air condition schedule selected from the candidate air condition schedules. To facilitate selecting the adjusted air condition schedule, the control system may determine efficiency metrics each indicative of operational efficiency expected to result if a corresponding candidate air condition schedule is implemented.

In some embodiments, operational efficiency of a climate control system may be improved by reducing operation related cost, such as energy consumption and/or carbon footprint. Thus, in some embodiments, the control system may determine an efficiency metric associated with a candidate air condition schedule based at least in part on energy consumption expected to result when the candidate air condition schedule is implemented. Additionally, the control system may determine the efficiency metric based at least in part on other factors, such as price per unit of electrical energy, carbon footprint resulting from product of a unit of electrical energy, and/or certainty of the predicted or expected performance.

In other words, in some embodiments, the control system may determine an efficiency metric associated with a candidate air condition schedule to factor in energy availability, which may vary over the control horizon of the candidate air condition schedule. For example, by determining associated efficiency metrics in this manner, the control system may select the second candidate temperature schedule over the first candidate temperature schedule even though total energy consumption is expected to greater due to cost per unit of energy being lower between 8:00-9:00 AM compared to between 4:00-5:00 PM. In this manner, the techniques described in the present disclosure may facilitate improving operation efficiency of a climate control system, for example, by enabling the climate control system to optimize target air conditions implemented while a building is unoccupied.

To help illustrate, a building 10 serviced by a heating, ventilating, and air conditioning (HVAC) system 11 (e.g., a climate control system) is shown in FIG. 1. In some embodiments, the building 10 may be a commercial structure or a residential structure. Additionally, the HVAC system 11 may include climate control equipment, such as one or more HVAC units 12 (e.g., climate control units) and/or one or more furnaces, that operates to produce temperature-controlled air, which may be supplied to internal spaces within the building via ductwork 14.

As described above, to facilitate controlling operation of the climate control equipment, the HVAC system 11 may include a control system. In some embodiments, the control system may be implemented using one or more control devices 16, such as a thermostat, a zone sensor, a zone control panel, a pressure transducer, and/or a temperature transducer. For example, a control device 16 may be a thermostat used to designate target air conditions, such as target temperature and/or target humidity level, within the building 10 and/or that measures air conditions present within the building 10.

To facilitate achieving the target air conditions, the control system may control operation of the HVAC unit 12 and/or other climate control equipment, such as fans or air dampers disposed in the ductwork 14, based at least in part on the target air conditions and measured air conditions. For example, when difference between measured temperature and target temperature is greater than a threshold, the control system may turn on or run the HVAC unit 12 to circulate refrigerant through one or more heat exchangers to facilitate producing temperature-controlled air. Additionally, the control system may turn on a fan and/or adjust position of an air damper to facilitate supplying the temperature-controlled air to internal spaces within the building 10 via the ductwork 14.

To facilitate producing temperature-controlled air, in some embodiments, the HVAC unit 12 may be selectively operated in different modes, such as a first-stage cooling mode, a second-stage cooling mode, a fan only mode, a first-stage heating mode, and a second-stage heating mode. For example, when operating in a heating mode or heat pump mode, the HVAC unit 12 may inject heat to produce heated air, which may then be supplied to internal spaces within the building 10. Additionally or alternatively, the HVAC system 11 may include a furnace that operates to produce the heated air. Furthermore, when operating in a cooling mode or air conditioning mode, the HVAC unit 12 may extract heat to produce cooled air, which may then be supplied to internal spaces within the building 10.

In some embodiments, the HVAC system 11 may be a split HVAC system, for example, which includes an outdoor HVAC unit and an indoor HVAC unit. Additionally or alternatively, an HVAC unit 12 may be a single package unit that includes other equipment, such as a blower, a fan, an integrated air handler, and/or an auxiliary heating unit. For example, in the depicted embodiment, the HVAC unit 12 is a rooftop unit (RTU) that conditions a supply air stream, such as environmental air and/or a return air flow from the building 10.

Figure 2:
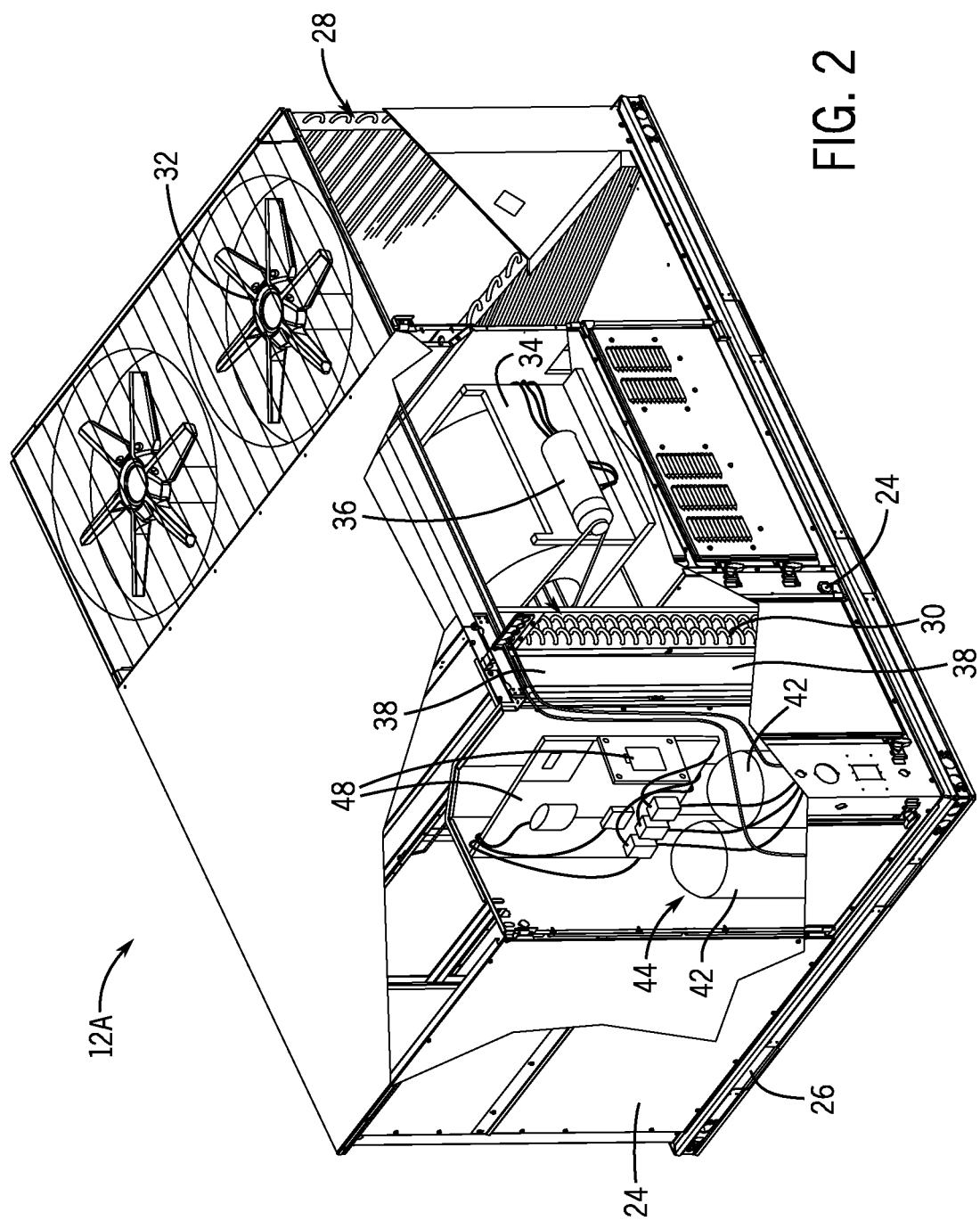
FIG. 2 is a partial cross-sectional view of an HVAC unit that may be included in the HVAC system of FIG. 1, in accordance with an embodiment of the present disclosure.

To help illustrate, an example of a single package HVAC unit 12A is shown in FIG. 2. As depicted, the HVAC unit 12A includes a housing 24, a first heat exchanger 28, a second heat exchanger 30, one or more fans 32, a blower assembly 34, one or more air filters 38, a compressor 44, and a control board 48, which may be communicatively coupled to or included in the HVAC control system. In some embodiments, the housing 24 may enclose the HVAC unit 12 to provide structural support and/or to protect to internal components from environmental and/or other contaminants. Additionally, in some embodiments, the housing 24 may be constructed of galvanized steel and insulated with aluminum foil faced insulation.

Furthermore, as in the depicted embodiment, rails 26 may be joined to the bottom perimeter of the housing 24 to provide a foundation for the HVAC unit 12A. For example, the rails 26 may provide access for a forklift and/or overhead rigging to install and/or remove the HVAC unit 12. Additionally, in some embodiments, the rails 26 may fit into "curbs," for example, implemented on the roof of the building 10 to enable the HVAC unit 12 to provide air to the ductwork 14 while blocking contaminants, such as rain, from leaking into the building 10.

As will be described in more detail below, the first heat exchanger 28 and the second heat exchanger 30 may be included in a refrigerant circuit (e.g., loop) that operates to circulate refrigerant, such as R-410A. In particular, the first heat exchanger 28 and the second heat exchanger 30 may each include tubing through which the refrigerant is circulated to facilitate heat exchange between the refrigerant and air. In some embodiments, the tubing may include multichannel tubing, copper tubing, aluminum tubing, and/or the like.

In other words, the first heat exchanger 28 and the second heat exchanger 30 may implement a thermal cycle in which the refrigerant undergoes phase changes and/or temperature changes as it flows through the first heat exchanger 28 and the second heat exchanger 30 to produce heated air and/or cooled air. For example, when operating in a cooling mode, the first heat exchanger 28 may function as a condenser to extract heat from the refrigerant and the second heat exchanger 30 may function as an evaporator to use the refrigerant to extract heat from the air to be supplied to internal spaces within the building 10. On the other hand, when operating in a heating mode, the first heat exchanger 28 may function as an evaporator to inject heat into the refrigerant and the second heat exchanger 30 may function as a condenser to inject heat from the refrigerant into the air to be supplied to internal spaces within the building 10.

To facilitate heat exchange, during operation, the fans 32 may draw environmental or outside air through the first heat exchanger 28. In this manner, the environmental air may be used to heat and/or cool as the refrigerant as it flows through the tubing of the first heat exchanger 28. Additionally, a blower assembly 34, powered by a motor 36, may draw air to be supplied to internal portions of the building 10 through the second heat exchanger 30. In some embodiments, the supply air may include environmental air, outside air, return air, inside air, or any combination thereof. In any case, in this manner, the refrigerant may be used to heat and/or cool the supply air as it flows through the tubing of the second heat exchanger 30.

In some embodiments, the HVAC unit 12A may flow supply air through one or more air filters 38 that remove particulates and/or other air contaminants from the supply air. For example, one or more air filters 38 may be disposed on an air intake side of the second heat exchanger 30 to reduce likelihood of contaminants contacting tubing of the second heat exchanger 30. Additionally or alternatively, one or more air filters 38 may be disposed on an air output side of the HVAC unit 12A to reduce likelihood of contaminants being supplied to internal spaces within the building 10.

The HVAC unit 12 also may include other HVAC equipment, such as a compressor 44, a solid-core filter drier, a drain pan, a disconnect switch, an economizer, pressure switches, and/or the like. In some embodiments, the compressor 44 may be a scroll compressor, a rotary compressor, a screw compressor, or a reciprocating compressor. Additionally, in some embodiments, the compressor 44 may be implemented using multiple selectable compressor stages 42. For example, in the depicted embodiment, the compressor 44 is implemented in a dual stage configuration with two compressor stages 42.

In this manner, an HVAC system 11 may be implemented with one or more single package HVAC units 12A. As described above, in other embodiments, an HVAC system 11 may be a split HVAC system. In such embodiments, instead of a single package HVAC unit 12A, the HVAC system 11 may be implemented with split HVAC units, such as an outdoor HVAC unit and an indoor HVAC unit.

Figure 3:
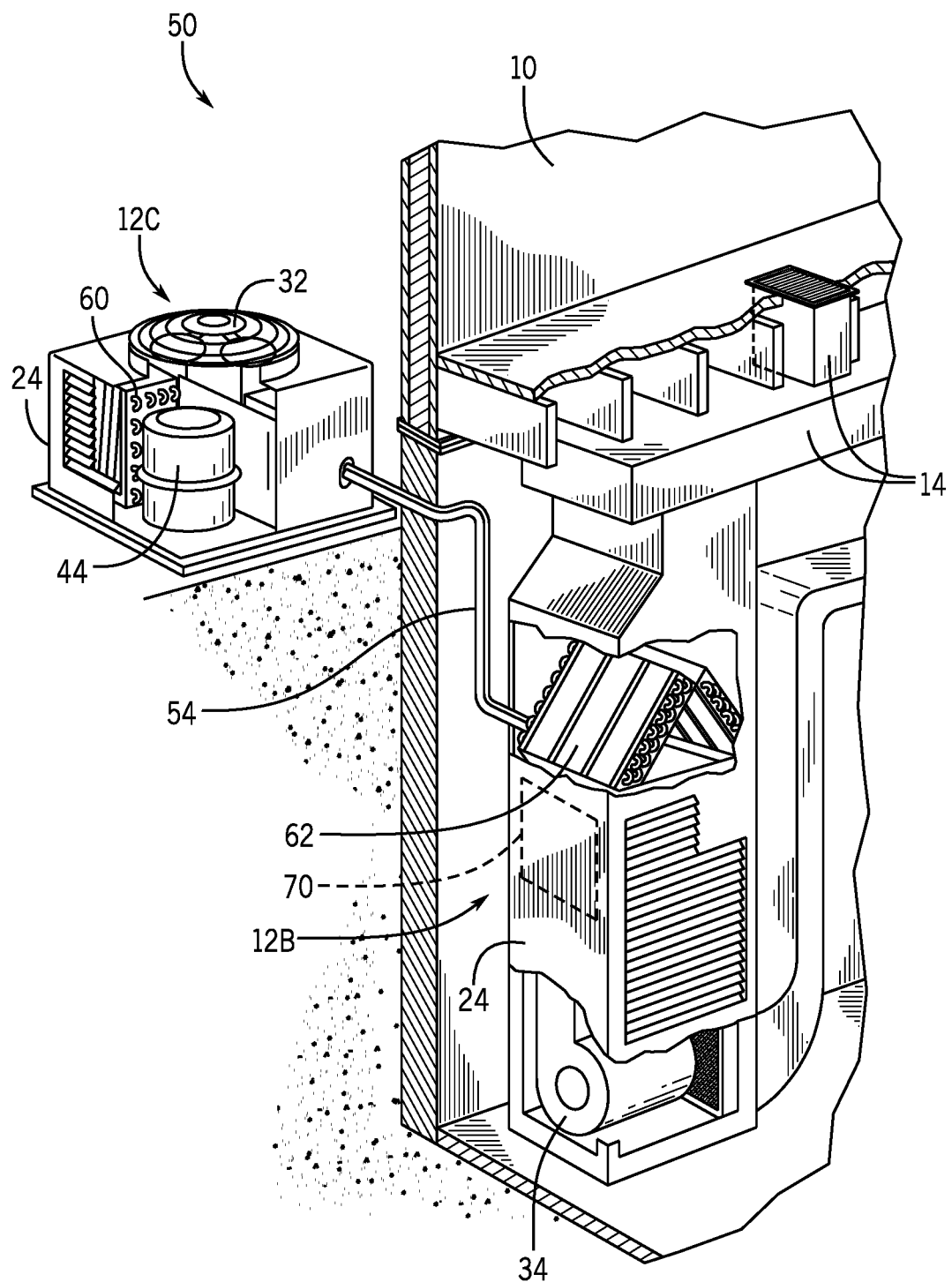
FIG. 3 is a partial cross-sectional view of an outdoor HVAC unit and an indoor HVAC unit that may be included in the HVAC system of FIG. 1, in accordance with an embodiment of the present disclosure.

To help illustrate, an example of a portion 50 of an HVAC system 11, which includes an indoor HVAC unit 12B and an outdoor HVAC unit 12C, is shown in FIG. 3. As depicted, the outdoor HVAC unit 12C may be implemented outside of the building 10, for example, adjacent a side of the building 10 and covered by a shroud to protect the system components from debris and/or other contaminants. On the other hand, the indoor HVAC unit 12B may be implemented inside the building 10, for example, in a utility room, an attic, a basement, or the like.

Additionally, as depicted, the outdoor HVAC unit 12C includes an outdoor heat exchanger 60 and a fan 32. In some embodiments, the outdoor heat exchanger 60 may be operated in a similar manner as the first heat exchanger 28 in the single package HVAC unit 12A. For example, the outdoor heat exchanger 60 may function as a condenser when in a cooling mode and as an evaporator when in a heating mode.

Furthermore, as depicted, the indoor HVAC unit 12B includes an indoor heat exchanger 62 and a blower assembly 66. In some embodiments, the indoor HVAC unit 12B may also include a furnace 70, for example, when HVAC system 11 is not implemented to operate in a heat pump mode. In such embodiments, the furnace 70 may combust fuel, such as natural gas, to produce a combustion product, which may be flowed through tubbing of a separate indoor heat exchanger to facilitate injecting heat from the combustion product into supply air to be routed through ductwork 14 of the building 10.

Additionally or alternatively, in some embodiments, the indoor heat exchanger 62 may be operated in a similar manner as the second heat exchanger 30 in the single package HVAC unit 12A. For example, the indoor heat exchanger 62 may function as an evaporator when in a cooling mode and as a condenser when in a heating mode. Thus, as depicted, the indoor HVAC unit 12B and the outdoor HVAC unit 12C may be fluidly coupled via one or more refrigerant conduits 54 to form a refrigerant circuit (e.g., loop), for example, typically transferring primarily liquid refrigerant in one direction and primarily vaporized refrigerant in the opposite direction.

Figure 4:
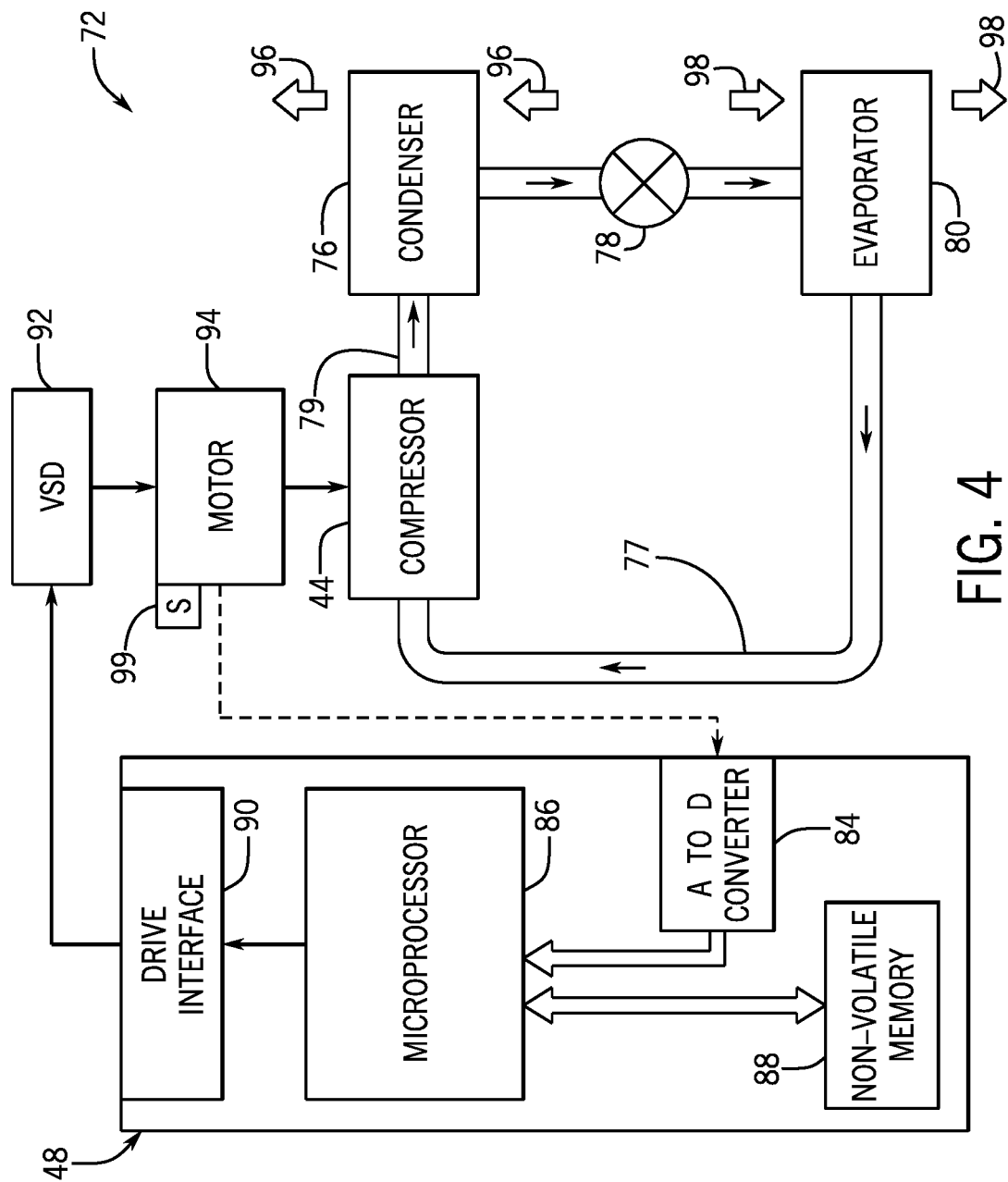
FIG. 4 is a block diagram of a refrigerant loop that may be implemented in the HVAC system of FIG. 1, in accordance with an embodiment of the present disclosure.

To help illustrate, an example of a refrigerant circuit 72 is shown in FIG. 4. As depicted, the refrigerant circuit 72 includes a compressor 44, a condenser 76, one or more expansion devices 78 or valves, and an evaporator 80. As described above, the condenser 76 and/or the evaporator 80 may each be implemented using one or more heat exchangers. In any case, actuation of the compressor 44 generally drives circulation of refrigerant through the refrigerant circuit 72. In particular, the compressor 44 may receive refrigerant vapor from the evaporator 80 via a suction line 77, compress the refrigerant vapor, and output the compressed refrigerant vapor to the condenser 76 via a discharge line 79.

As the refrigerant flows through the condenser 76, a first air flow 96 may be used to extract heat from refrigerant to facilitate condensing the vapor into liquid. When operating in a cooling mode, the first air flow 96 may be produced using environmental or outside air, for example, by actuating a fan 32. On the other hand, when operating in a heating mode, the first air flow 96 may be produced using supply air, for example, by actuating a blower assembly 34. Before being supplied to the evaporator 80, the refrigerant may flow through one or more expansion devices 78 to facilitate reducing pressure.

As the refrigerant flows through the evaporator 80, the refrigerant may undergo a phase change from liquid to vapor that facilitates extracting heat from a second air flow 98. When operating in a cooling mode, the second air flow 98 may be produced using supply air, for example, by actuating a blower assembly 34. On the other hand, when operating in a heating mode, the second air flow 98 may be produced using environmental or outside air, for example, by actuating a fan 32. Thereafter, the refrigerant may be circulated back to the compressor 44.

As depicted, the compressor 44 may be actuated by a motor 94 during operation. In some embodiments, the motor 94 may be a switched reluctance motor, an induction motor, an electronically commutated permanent magnet motor, and/or another suitable electromechanical motor. In other words, the motor 94 may actuate the compressor 44 when electrical power is supplied to the motor 94.

To facilitate controlling supply of electrical power to the motor 94, a variable speed drive (VSD) 92 and/or a control board 48 may be coupled to the motor 94. In particular, the variable speed drive 92 may receive alternating current (AC) electrical power having a fixed line voltage and a fixed line frequency from a power source, such as an electrical grid. Additionally, the control board 48 may control operation of the variable speed drive 92 to supply alternating current (AC) electrical power with a variable voltage and/or a variable frequency to the motor 94, for example, by controlling switching devices implemented in the variable speed drive 92. In other embodiments, the motor 94 may be powered directly from an AC power source or a direct current (DC) power source, such as a battery.

To facilitate controlling operation of the variable speed drive 92, as in the depicted embodiment, the control board 48 may include an analog to digital (A/D) converter 84, a microprocessor 86, non-volatile memory 88, and a drive interface 90 coupled to the variable speed drive 92. For example, to control switching in the variable speed drive 92, the microprocessor 86 may execute instructions stored in a tangible, non-transistor, computer readable medium, such as the non-volatile memory 88, to determine control signals or commands, which may be communicated to the variable speed drive 92 via the drive interface 90. Additionally, the control board 48 may control switching in the variable speed drive 92 based at least in part on feedback from the motor 94 and/or other sensors 99, for example, as analog electrical signals, which may be converted to digital data via the analog to digital (A/D) converter 84 before processing by the microprocessor 86.

In any case, as described above, an HVAC system 11 may include a control system that controls operation of its HVAC equipment to facilitate controlling air conditions, such as temperature and/or humidity level, present within a building 10 serviced by the HVAC system 11. Thus, in some embodiments, an HVAC control system may include one or more control boards 48. Additionally or alternatively, the HVAC control system may be communicatively coupled to one or more control boards 48 and, thus, corresponding HVAC equipment.

Figure 5:
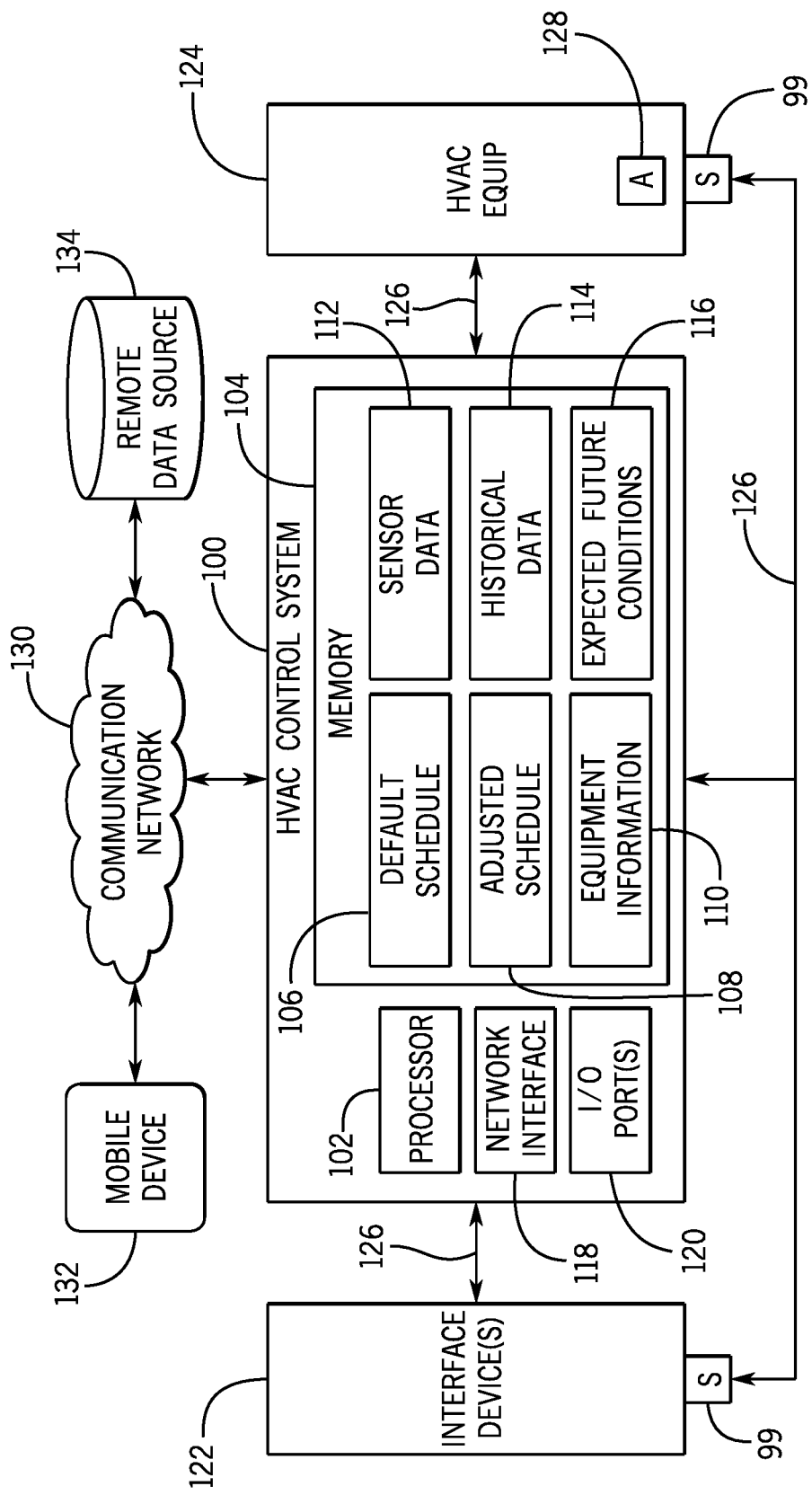
FIG. 5 is a block diagram of a portion of the HVAC system of FIG. 1 that includes a control system and HVAC equipment, in accordance with an embodiment of the present disclosure.

To help illustrate, an example of a control system 100, which may be implemented in an HVAC system 11, is shown in FIG. 5. As described above, in some embodiments, the control system 100 may be implemented using one or more control devices 16, such as a thermostat, a zone sensor, and/or a zone control panel. In any case, as in the depicted embodiment, the control system 100 may include a processor 102, memory 104, a network interface 118, and one or more input/output (I/O) ports 120.

In some embodiments, the control system 100 may be communicatively coupled to one or more interface devices 122, one or more sensors 99, and/or HVAC equipment 124 via communication buses 126 coupled to its I/O ports 120. For example, via communication buses 126 coupled to its I/O ports 120, the control system 100 may be communicatively coupled to an interface device 122, such as a thermostat, a sensor 99, such as an occupancy sensor, and HVAC equipment 124, such as an air damper 128, an HVAC unit 12, a fan 32, a blower assembly 34, a variable speed drive 92, a motor 94, and/or the like. Additionally, in some embodiments, devices coupled to the communication buses 126 may communicate using a serial communication protocol, such as a Modbus communication protocol.

Furthermore, in some embodiments, the control system 100 may be communicatively coupled to a communication network 130 via its network interface 118. For example, the network interface 118 may connect the control system 100 to a personal area network (PAN), such as a Bluetooth network, a local area network (LAN), such as an 802.11x Wi-Fi network, and/or a wide area network (WAN), such as a cellular network. In this manner, the network interface 118 may enable the control system 100 to communicate with a mobile device 132 and/or a remote data source 133, such as a weather database and/or a utility provider server, connected to the communication network 130.

To facilitate controlling operation of the HVAC system 11, in some embodiments, the processor 102 may execute instructions stored in memory 104. Thus, in some embodiments, the processor 102 may include one or more general purpose microprocessors, one or more application specific processors (ASICs), one or more field programmable logic arrays (FPGAs), or any combination thereof. Additionally, in some embodiments, the memory 104 may include one or more tangible, non-transitory, computer-readable media. For example, the memory 104 may include random access memory (RAM), read only memory (ROM), flash memory, hard drives, optical discs, and/or the like In addition to executable instructions, the memory 104 may store data to be processed or analyzed by the processor 102. For example, the memory 104 may store a default air condition schedule 106, an adjusted air condition schedule 108, equipment information 110, sensor data 112, historical data 114, expected future conditions 116, and/or the like. In some embodiments, the default air condition schedule 106 may indicate target air conditions associated with each time step over a control horizon. For example, the default air condition schedule 106 may indicate a target temperature or temperature setpoint for each hour time step during a twenty-four hour control horizon. In fact, in some embodiments, the control system 100 may determine the default air condition schedule 106 based at least in part on user inputs received at an interface device 122 and/or a mobile device 132.

Additionally, in some embodiments, the adjusted air condition schedule 108 may be used to override at least a portion of the default air condition schedule 106, for example, when a building 10 serviced by the HVAC system 11 is unoccupied. In other words, the adjusted air condition schedule 108 may also indicate target air conditions for each time step over a control horizon. For example, the adjusted air condition schedule 108 may indicate a target temperature or temperature setpoint for each hour time step during a nine hour control horizon during which the building 10 is expected to remain unoccupied. As will be described in more detail below, in some embodiments, the adjusted air condition schedule 108 may be determined based at least in part on the default air condition schedule 106, the equipment information 110, the sensor data 112, the historical data 114, and/or the expected future conditions 116.

In some embodiments, the sensor data 112 may be received from standalone sensors 99 and/or integrated sensors 99, for example, integrated in an interface device 122 and/or with the HVAC equipment 124. For example, the control system 100 may receive sensor data 112 indicative of temperature present within a building 10 serviced by the HVAC system 11 and/or environmental temperature present outside the building from a temperature sensor 99. Additionally, the control system 100 may receive sensor data 112 indicative of energy usage of the HVAC equipment 124 (e.g., climate control equipment) from a power sensor 99. Furthermore, the control system 100 may receive sensor data 112 indicative of occupancy status of a building 10 serviced by the HVAC system 11 from an occupancy sensor 99.

Additionally, in some embodiments, the equipment information 110 may identify the HVAC equipment 124 implemented in the HVAC system 11 and/or operational capabilities of the HVAC equipment 124. For example, the equipment information 110 may indicate that the HVAC equipment 124 includes an HVAC unit 12 that is capable of operating in an air conditioning mode or a heat pump mode. Additionally, the equipment information 110 may indicate that the HVAC equipment 124 includes a variable speed drive 92 and, thus, is capable of operating in a stage-one conditioning mode or a stage-two conditioning mode.

Furthermore, the equipment information 110 may indicate operational parameters of the HVAC equipment 124. For example, the equipment information 110 may indicate operating duration of the HVAC equipment 124 and/or operating mode of the HVAC equipment 124. Thus, in some embodiments, the control system 100 may receive at least a portion of the equipment information 110 from the HVAC equipment 124. Additionally or alternatively, the control system 100 may receive at least a portion of the equipment information 110 via the communication network 130, for example, from a remote data source 134 provided by a manufacturer of the HVAC equipment 124.

In some embodiments, the historical data 114 may include historical performance data and/or historical occupancy data. In particular, the historical performance data may be indicative of previous performance of an HVAC system 11 while servicing a building 10. Thus, in some embodiments, the historical performance data may be determined based at least in part on equipment information 110, for example, which indicates operating duration and/or equipment mode during the operating duration. Additionally or alternatively, the historical performance data may be determined based at least in part on sensor data 112 received from one or more sensors 99, for example, indicative of environmental air conditions, air conditions within the building 10, and/or energy usage by the HVAC equipment 124.

To help illustrate, a diagrammatic representation of historical performance data 114A is shown in FIG. 6. As in the depicted example, the historical performance data 114A may generally associate periods of time with environmental air conditions during each period of time, temperature change within a building 10 during each period of time, equipment mode of HVAC equipment 124 during each period of time, and energy usage of the HVAC equipment 124 during each period of time. For example, in the depicted example, a first row 144 indicates that previously, when the environmental temperature was 80° F. and the environmental humidity level was 20%, operating the HVAC equipment 124 using the stage-two cooling mode (Y2) for thirty minutes reduced temperature within the building 10 from 80° F. to 60° F. and consumed 30 kWh of energy.

In a similar manner, other rows of the historical performance data 114A may associate previous periods of time with performance during those periods of time. For example, in the depicted example, a second row 146 indicates that previously, when the environmental temperature was 80° F. and the environmental humidity level was 20%, operating the HVAC equipment 124 using the stage-two cooling mode (Y2) for seven and a half minutes reduced temperature within the building 10 from 80° F. to 75° F. and consumed 8 kWh of energy. Additionally, a third row 148 indicates that previously, when the environmental temperature was 80° F. and the environmental humidity level was 20%, operating the HVAC equipment 124 using the first stage cooling mode (Y1) for thirty minutes reduced temperature within the building 10 from 80° F. to 75° F. and consumed 10 kWh of energy.

To facilitate determining temperature retention characteristics of the building, other rows of the historical performance data 114A may indicate performance while the HVAC equipment 124 is turned off or in an off mode. For example, in the depicted example, an Mth row 150 indicates that previously, when the environmental temperature was 80° F. and the environmental humidity level was 20%, maintaining the HVAC equipment 124 in an off mode for sixty minutes resulted in temperature within the building 10 increasing from 60° F. to 63° F. Additionally, an M+1th row 152 indicates that previously, when the environmental temperature was 80° F. and the environmental humidity level was 20%, maintaining the HVAC equipment 124 in an off mode for sixty minutes resulted in temperature within the building 10 increasing from 65° F. to 67° F. Furthermore, an M+2th row 154 indicates that previously, when the environmental temperature was 80° F. and the environmental humidity level was 20%, maintaining the HVAC equipment 124 in an off mode for sixty minutes resulted in temperature within the building 10 increasing from 70° F. to 71° F.

Moreover, an M+3th row 156 indicates that previously, when the environmental temperature was 80° F. and the environmental humidity level was 20%, maintaining the HVAC equipment 124 in an off mode for sixty minutes resulted in temperature within the building 10 increasing from 74° F. to 75° F.

It should be appreciated that the depicted historical performance data 114A is merely intended to be illustrative and not limiting. In particular, the historical performance data 114A may include performance data that resulted from different operating conditions, such as different environmental conditions and/or different starting inside air conditions. For example, the historical performance data 114A may include performance data resulting when the environmental temperature was 60° F., 65° F., 70° F., 75° F., 85° F., 90° F., and/or the like. Additionally or alternatively, the historical performance data 114A may include performance data resulting when the environmental humidity level was 0%, 5%, 10%, 15%, 25%, 30%, and/or the like.

In any case, as described above, the historical data 114 may additionally or alternatively include historical occupancy data. In some embodiments, the historical occupancy data may be indicative of previous occupancy status of a building 10 serviced by the HVAC system 11. Thus, in some embodiments, the historical occupancy data may be determined based at least in part on sensor data 112 received from one or more occupancy sensors 99 deployed in or around the building 10. Additionally or alternatively, the historical occupancy data may be determined based at least in part on location data received from a global positioning system (GPS), for example, implemented in a potential occupant's mobile device 132.

To help illustrate, a diagrammatic representation of example historical occupancy data 114B is shown in FIG. 7. As in the depicted example, the historical occupancy data 114B may generally associates periods of time with occupancy status during those periods of time. For example, in the depicted example, a first row 136 indicates that on a first day, which was a Friday, occupants of a building 10 serviced by the HVAC system 11 left at 7:58 AM and returned at 4:54 PM. In other words, during a twenty-four hour control horizon that encompasses the first day, the first row 136 of the historical occupancy data 114B indicates that occupancy status of the building 10 was occupied between 12:00 AM to 7:57 AM, unoccupied between 7:58 AM to 4:54 PM, and occupied between 4:55 PM and 11:59 PM.

In a similar manner, other rows of the historical occupancy data 114B may associate previous control horizons used to control operation of the HVAC system 11 with occupancy status of a building 10 serviced by the HVAC system 11 during the control horizons. For example, in the depicted example, a second row 138 indicates that on a second day, which was a Saturday, occupancy status of the building 10 was occupied between 12:00 AM to 11:32 AM, unoccupied between 11:33 AM to 1:44 PM, occupied between 1:45 PM to 6:14 PM, unoccupied between 6:15 PM to 9:21 PM, and occupied between 9:22 PM to 11:59 PM. Additionally, an N−1th row 140 indicates that on an N−1th day, which was a Thursday, occupancy status of the building was occupied between 12:00 AM to 8:06 AM, unoccupied between 8:07 AM to 5:19 PM, and occupied between 5:20 PM and 11:59 PM. Furthermore, an Nth row 142 indicates that on an Nth day, which was a Friday, occupancy status of the building was occupied between 12:00 AM to 7:54 AM, unoccupied between 7:55 AM to 4:44 PM, and occupied between 4:45 PM and 11:59 PM.

As will be described in more detail below, in some embodiments, the historical occupancy data 114B associated with a building 10 serviced by the HVAC system 11 may be used to predict its occupancy status during subsequent time steps or control horizons. To facilitate improving prediction accuracy, in some embodiments, determination of expected future conditions 116, such as expected occupancy status, may be adaptively or dynamically adjusted. For example, to determine expected occupancy status for a weekday, the control system 100 may less heavily weight or even disregard occupancy status on the second day, which was a Saturday. Additionally or alternatively, to determine expected occupancy status for a Friday, the control system 100 may more heavily weight the occupancy status of the first day and the Nth data, which were both Fridays, compared to other days of the week. In other words, in some embodiments, the control system 100 may determine at least a portion of the expected future conditions 116 based at least in part on the historical data 114.

Additionally or alternatively, the control system 100 may receive at least a portion of the expected future conditions 116 from a communication network 130. For example, via the communication network 130, the control system 100 may receive weather forecast data from a remote data source 134 that indicates temperature and/or humidity expected to subsequently occur around the building 10. Additionally or alternatively, the control system 100 may receive an indication of energy availability from a utility provider, for example, in the form of a schedule that indicates price and/or carbon footprint per unit of energy.

It should be appreciated that the depicted historical occupancy data 114B is merely intended to be illustrative and not limiting. In particular, the historical occupancy data 114B may include occupancy data determined during other days of the week. For example, the historical occupancy data 114B may also include occupancy data determined for Sundays, Mondays, Tuesdays, and Wednesdays. Additionally or alternatively, the historical occupancy data 114B may include occupancy data associated with specific days of the year, such as holidays.

In any case, as described above, the control system 100 may control operation of HVAC equipment 124 implemented in an HVAC system 11 based at least in part on the default schedule 106 and/or the adjusted schedule 108, which may be determined based at least in part on the historical data 114 associated with the HVAC system 11 and the expected future conditions 116. In particular, based at least in part on deviation between measured air conditions and target air conditions indicated by an air condition schedule, the control system 100 may control operation of the HVAC equipment 124 by communicating control commands or signals that instruct the HVAC equipment 124 to adjust operation. For example, the control system 100 may output a first control signal that instructs an air damper to adjust its damper position. Additionally or alternatively, the control system 100 may output a second control signal that instructs an HVAC unit 12 to turn on, to operate in a stage-one cooling mode, to operate in a stage-two cooling mode, to turn off, to operate in a stage-one heating mode, or to operate in a stage-two heating mode.

Figure 8:
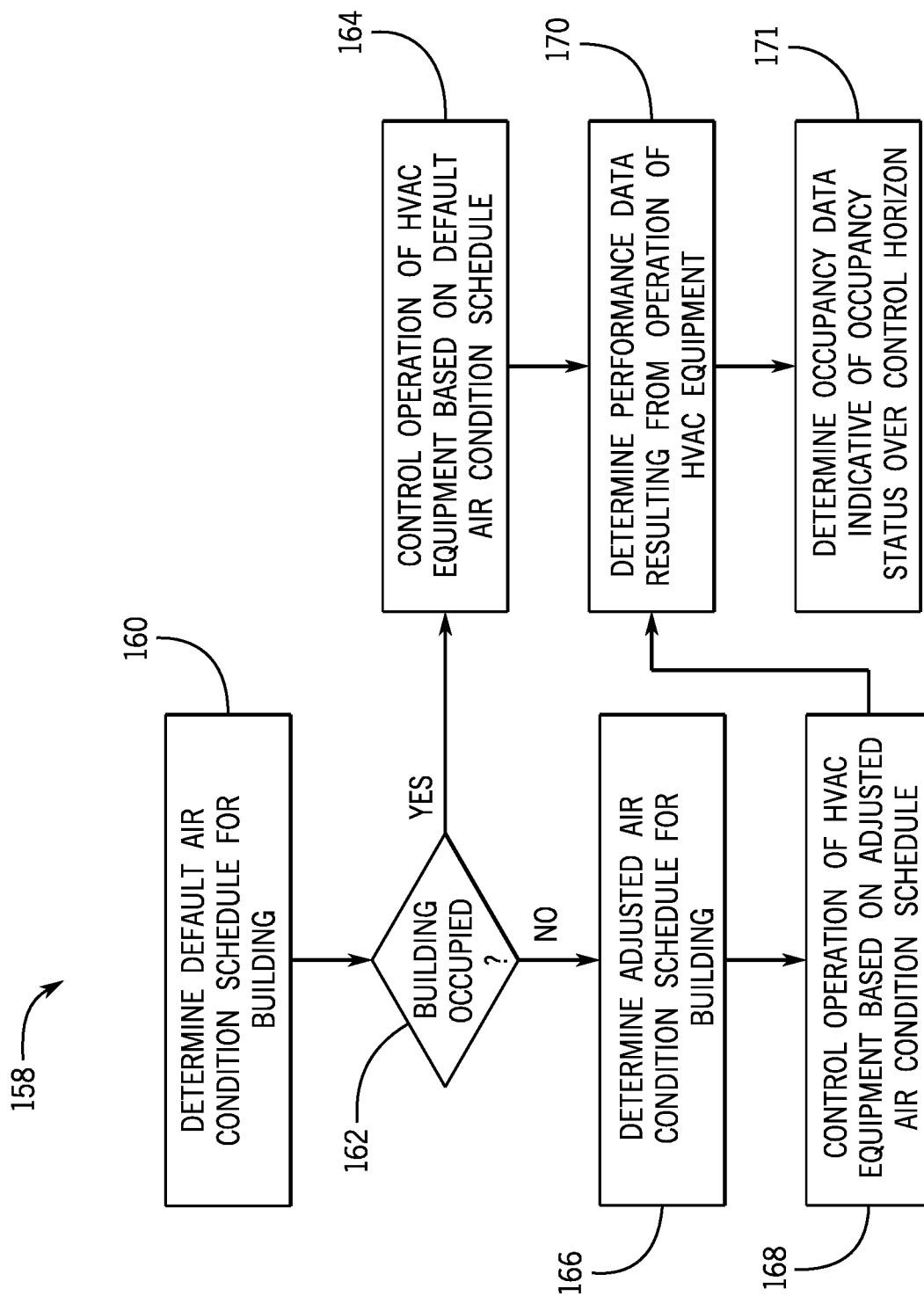
FIG. 8 is a flow diagram of a process for operating the control system of FIG. 5 to control operation of the HVAC equipment of FIG. 5, in accordance with an embodiment of the present disclosure.

To help illustrate, an example of a process 158 for operating an HVAC control system is described in FIG. 8. Generally, the process 158 includes determining a default air condition schedule for a building (process block 160), determining whether the building is occupied (decision block 162), and controlling operation of HVAC equipment based on the default air condition schedule when the building is occupied (process block 164). When the building is not occupied, the process 158 includes determining an adjusted air condition schedule for the building (process block 166) and controlling operation of the HVAC equipment based on the adjusted air condition schedule (process block 168). Additionally, the process 158 includes determining performance data resulting from operation of the HVAC equipment (process block 170) and determining occupancy data indicative of occupancy status over a control horizon (process block 171).

Although the process 158 is described in a particular order, which represents a particular embodiment, it should be noted that the process 158 may be performed in any suitable order. Additionally, other embodiments of the process 158 may omit process blocks and/or include suitable additional process blocks. Moreover, in some embodiments, the process 158 may be implemented at least in part by executing instructions stored in a tangible, non-transitory, computer-readable medium, such as memory 104, using processing circuitry, such as processor 102.

Accordingly, in some embodiments, a control system 100 implemented in an HVAC system 11 may determine a default air condition schedule for a building 10 serviced by the HVAC system 11 (process block 160). As described above, the default air condition schedule 106 may indicate target air conditions, such as target temperature and/or target humidity level, for each time step over a control horizon. For example, the default air condition schedule 106 may indicate a temperature setpoint of 75° F. for each hour time step during a twenty-four hour control horizon.

In some embodiments, the default air condition schedule 106 may be predetermined and stored in memory 104, for example, by a manufacturer or a system integrator. Additionally or alternatively, the default air condition schedule 106 may be input or otherwise modified by a user. For example, a user may modify the default air condition schedule 106 via an interface device 122, such as a thermostat, communicatively coupled to an I/O port 120 of the control system 100 via one or more communication buses 126. Additionally or alternatively, a user may modify the default air condition schedule 106 via a mobile application running on a mobile device 132 communicatively coupled to a network interface 118 of the control system 100 via a communication network 130.

Furthermore, based at least in part on its occupancy status, the control system 100 may determine whether the building 10 is occupied (decision block 162). In some embodiments, the control system 100 may determine whether the building 10 is currently occupied based at least in part on sensor data 112 received from one or more occupancy sensors 99. For example, the control system 100 may determine that the building is currently occupied when an occupancy sensor 99 detects motion within the building 10.

When the building 10 is occupied, the control system 100 may control operation of HVAC equipment 124 implemented in the HVAC system 11 using the default air condition schedule 106, for example, since the default air condition schedule 106 may have been input by a potential occupant of the building 10 (process block 164). As described above, the control system 100 may control operation of the HVAC equipment 124 based at least in part on deviation between measured air conditions and target air conditions indicated by the default air condition schedule 106. For example, when measured temperature is greater than the target temperature indicated by the default air condition schedule 106 by more than a first threshold amount, the control system 100 may output a first control signal that instructs an HVAC unit 12 to turn on and/or to switch from a stage-one conditioning mode to a stage-two conditioning mode. Additionally, when difference between the measure temperature and the target temperature is less than a second threshold, the control system 100 may output a second control signal that instructs an HVAC unit 12 to turn off and/or to switch from the stage-two conditioning mode to the stage-one conditioning mode.

On the other hand, when the building 10 is not occupied, the control system 100 may determine an adjusted air condition schedule 108, for example, which may be implemented to override at least a portion of the default air condition schedule (process block 166). As an illustrative example, the adjusted air condition schedule 108 may indicate target air conditions, such as target temperature and/or target humidity level, for each hour time step during a nine hour control horizon during which the building 10 is expected to remain unoccupied. Additionally, in some embodiments, the adjusted air condition schedule 108 may be determined based at least in part on the default air condition schedule 106, the equipment information 110, the sensor data 112, the historical data 114, and/or the expected future conditions 116.

Figure 9:
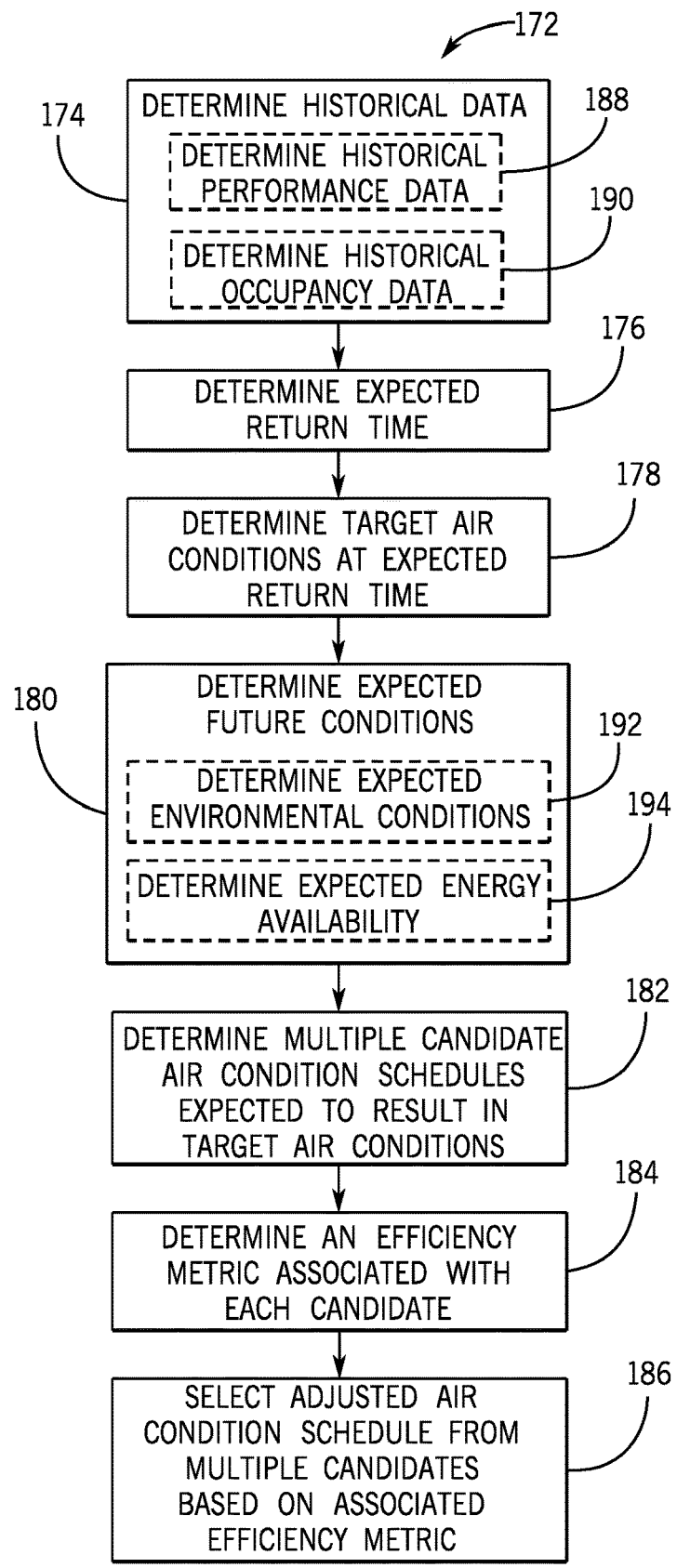
FIG. 9 is a flow diagram of a process for determining an adjusted air condition schedule based at least in part on historical data associated with the building of FIG. 1 and/or the HVAC system of FIG. 1, in accordance with an embodiment of the present disclosure.

To help illustrate, an example of a process 172 for determining an adjust air condition schedule 108 is described in FIG. 9. Generally, the process 172 includes determining historical data (process block 174), determining an expected return time (process block 176), determining target conditions at the expected return time (process block 178), determining expected future conditions (process block 180), determining multiple candidate air condition schedules expected to result in the target air conditions (process block 182), determining an efficiency metric associated with each candidate air condition schedule (process block 184), and selecting an adjust air condition schedule from the candidate air condition schedules based on associated efficiency metrics (process block 186).

Although the process 172 is described in a particular order, which represents a particular embodiment, it should be noted that the process 172 may be performed in any suitable order. Additionally, other embodiments of the process 172 may omit process blocks and/or include suitable additional process blocks. Moreover, in some embodiments, the process 172 may be implemented at least in part by executing instructions stored in a tangible, non-transitory, computer-readable medium, such as memory 104, using processing circuitry, such as processor 102.

Accordingly, in some embodiments, a control system 100 implemented in an HVAC system 11 may determine historical data 114 associated with the HVAC system 11 and/or a building 10 serviced by the HVAC system 11 (process block 174). In some embodiments, the historical data 114 may be stored in and, thus, retrieved from a tangible, non-transitory, computer-readable medium, for example, implemented in memory 104 and/or a remote data source 134. Additionally, as described above, historical data 114 may include historical performance data 114A and/or historical occupancy data 114B.

Thus, in some embodiments, the control system 100 may determine historical performance data 114A resulting from previous operation of the HVAC system 11 while deployed in the building 10 (process block 188). As will be described in more detail below, performance data resulting from operation of the HVAC system 11 over various periods of time may be stored as historical performance data 114A. In some embodiments, the performance data associated with a period of time may indicate environmental air conditions during the period of time, temperature change within the building 10 during the period of time, equipment mode of HVAC equipment 124 during the period of time, and energy usage of the HVAC equipment 124 during the period of time.

Additionally or alternatively, the control system 100 may determine historical occupancy data 114B indicative of a previous occupancy status or schedule of the building 10 serviced by the HVAC system 11 (process block 190). In some embodiments, occupancy data indicative of occupancy status of the building 10 over one or more control horizons may be stored as historical occupancy data 114B. Additionally, in some embodiments, the occupancy data may indicate the occupancy status by indicating when occupants left the building 10 unoccupied and/or when occupants returned to occupy the building 10.

Thus, based at least in part on the historical data 114, the control system 100 may determine an expected return time for a current control horizon (process block 176). In some embodiments, the control system 100 may determine the expected return time by predicting occupancy status of the building 10 based at least in part on the historical occupancy data 114B. In particular, in some embodiments, the control system 100 may predict future occupancy status of the building 10 based at least in part on a weighted average of the historical occupancy data 114B. For example, with reference to the historical occupancy data 114B of FIG. 7, the control system 100 may predict that occupancy status of the building 10 on a weekday will be occupied between 12:00 AM to approximately 8:00 AM, unoccupied between approximately 8:01 AM to approximately 5:00 PM, and occupied between approximately 5:01 PM to 11:59 PM. In other words, when the current control horizon encompasses a weekday, the control system 100 may predict that the expected return time is approximately 5:01 PM.

To facilitate improving prediction accuracy, in some embodiments, the control system 100 may dynamically or adaptively adjust prediction of the future occupancy status, for example, by adjusting the weighting applied to the historical occupancy data 114B associated with different days. As an illustrative example, when determining expected occupancy status of the building 10 on a weekday, the control system 100 may adaptively reduce weighting applied to the historical occupancy data 114B associated with the second day, which was a Saturday. Additionally or alternatively, when determining expected occupancy status of the building 10 for a Friday, the control system 100 may adaptively increase weighting applied to the historical occupancy data 114B associated with the first day and the Nth day, which were both Fridays, relative to the N−1th day, which was a weekday, but not a Friday. For example, the control system 100 may predict that occupancy status of the building 10 on a Friday will be occupied between 12:00 AM to approximately 7:56 AM, unoccupied between approximately 7:57 AM to approximately 4:49 PM, and occupied between approximately 4:50 PM to 11:59 PM. In other words, when the current control horizon encompasses a Friday, the control system 100 may predict that the expected return time is approximately 4:50 PM.

In other words, the control system 100 may predict future occupancy status of the building 10 based at least in part on its previous occupancy patterns. Thus, in some embodiments, the weighting applied to different days to predict future occupancy status may be dynamically or adaptively adjusted based on various criteria. For example, when predicting future occupancy status, the control system 100 may increase weighting applied to more recent days compared to older days. Additionally or alternatively, when predicting future occupancy status, the control system 100 may increase weighting applied to days with similar environmental conditions.

Furthermore, the control system 100 may determine target air conditions, such as target temperature and/or target humidity level, associated with the expected return time (process block 178). In some embodiments, since it may have been input by a potential occupant of the building 10, the control system 100 may determine target air conditions associated with the expected return time based at least in part on the default air condition schedule 106. For example, when the default air condition schedule 106 associates a 75° F. temperature setpoint with the time step from 5:00-6:00 PM and the expected return time is 5:01 PM, the control system 100 may determine that the target temperature at the expected return time is 75° F.

The control system 100 may also determine future conditions 116 expected to subsequently occur during the current control horizon (process block 180). In some embodiments, the control system 100 may predict the expected future conditions 116 based at least in part on the historical data 114. Additionally, as described above, the expected future conditions 116 may include environmental conditions and/or energy availability expected to occur during the current control horizon.

Thus, in some embodiments, the control system 100 may determine expected environmental conditions, such as environmental temperature and/or environmental humidity level, for the building 10 serviced by the HVAC system 11 (process block 192). In some embodiments, the control system 100 may determine the expected environmental conditions based at least in a weather forecast, for example, received from a remote data source 134 provided by a weather service. To facilitate improving accuracy of the expected environmental conditions, in some embodiments, the control system 100 may adaptively adjust the environmental conditions indicated by the weather forecast based at least in part on environmental conditions measured by one or more sensors 99 implemented in the HVAC system 11. For example, the control system 100 may offset environmental conditions predicted by the weather forecast based at least in part on a difference between environmental conditions measured by the HVAC system 11 at a current time and the environmental conditions indicated by the weather forecast for the current time.

Additionally or alternatively, the control system 100 may determine expected energy availability provided to the HVAC system 11 (process block 194). In some embodiments, the expected energy availability may indicate cost for obtaining a unit of electrical energy, for example, as a monetary price per unit price and/or as a carbon footprint resulting from production of a unit of electrical energy. Thus, in some embodiments, the control system 100 may determine expected energy availability from a remote data source 134, such as a database or server provided by a utility provider. In fact, in some embodiments, the utility provider may send a preemptive notification that load shedding will occur at a specific time in the future, thereby limiting energy available to operate the HVAC system 11 at that time.

In any case, based at least in part on the target air conditions associated with the expected return time, the control system 100 may determine one or more candidate air condition schedules (process block 182). In particular, the control system 100 may determine candidate air condition schedules expected to result in the target air conditions associated with the expected return time at or slightly before the current time reaches the expected return time, for example, subject to constraints, such as equipment constraints, energy availability constraints, maximum air condition constraints, and/or minimum air condition constraints. Thus, to facilitate determining the candidate air condition schedules, the control system 100 may predict performance of the HVAC system 11 during an unoccupied control horizon from the current time to the expected return time.

Since resulting from previous operation of the HVAC system 11 while deployed in the building 10, the control system 100 may predict that performance of the HVAC system 11 based at least in part on the historical data 114. In some embodiments, the control system 100 may tune or train a model based at least in part on the historical performance data 114A to describe relationship between performance of the HVAC system 11, environmental conditions, and air conditions present within the building 10. In such embodiments, by inputting the expected future conditions 116 into the model and starting inside air conditions, the control system 100 may predict performance of the HVAC system 11 (e.g., operating duration, operating mode, and/or energy consumption) and resulting ending inside air conditions.

In other words, the control system 100 may generally predict that performance of the HVAC system 11 will be similar or the same when operating under the same or similar operating (e.g., environmental conditions and/or inside air conditions). For example, when the expected environmental temperature is 80° F. and the expected environmental humidity level is 20%, the control system 100 may predict that running the HVAC equipment 124 in a stage-one cooling mode will reduce inside air temperature by approximately 10° F. per hour and consume approximately 20 kWh of energy per hour. Similarly, when the expected environmental temperature is 80° F. and the expected environmental humidity level is 20%, the control system 100 may predict that running the HVAC equipment 124 in a stage-two cooling mode will reduce inside air temperature by approximately 40° F. per hour and consume approximately 48 kWh of energy per hour.

Since, at least in some instances, a large number of different air condition schedules can achieve the target air conditions at the expected return time, in some embodiments, the control system 100 may determine the candidate air condition schedules in accordance with a defined control scheme, such as a setback control scheme that generally maintains target air conditions constant during a control horizon before ramping up or down the target air conditions towards the end of the control horizon. For example, in accordance with the setback control scheme, the control system 100 may determine a first candidate air condition schedule with a temperature setpoint that is 85° F. between 8:00 AM-4:00 PM and that gradually decreases from 85° F. to 75° F. between 4:00-5:00 PM. Additionally or alternatively, the control system 100 may determine a second candidate air condition schedule with a temperature setpoint that is 95° F. between 8:00 AM-4:30 PM and that gradually decreases from 95° F. to 75° F. between 4:30-5:00 PM.

To facilitate further improving (e.g., optimizing) operational efficiency of HVAC system 11, the control system 100 may additionally or alternatively consider one or more candidate air condition schedules determined in accordance with other control schemes, such as a pre-condition control scheme that generally ramps up or down target air conditions towards the beginning of a control horizon before subsequently maintaining the target air conditions constant for the remainder of the control horizon. For example, in accordance with the pre-condition control scheme, the control system 100 may determine a third candidate air condition schedule with a temperature setpoint that gradually decreases from 80° F. to 65° F. between 8:00-9:30 AM and is a maximum inside air temperature between 8:30 AM-5:00 PM. Furthermore, in accordance with the pre-condition control scheme, the control system 100 may determine a fourth candidate air condition schedule with a temperature setpoint that gradually decreases from 80° F. to 60° F. between 8:00-8:30 AM and is the maximum inside air temperature between 8:30 AM-5:00 PM.

To facilitate differentiating the candidate air condition schedules, the control system 100 may determine an efficiency metric associated with each candidate air condition schedule (process block 184). In particular, since each is expected to result in the target air conditions at least by the expected return time, the efficiency metrics may be formulated to balance or optimize various factors, for example, via an objective function. For example, in some embodiments, the efficiency metrics may be formulated to facilitate optimizing energy usage and, thus, operational efficiency of the HVAC system 11.

Figure 10:
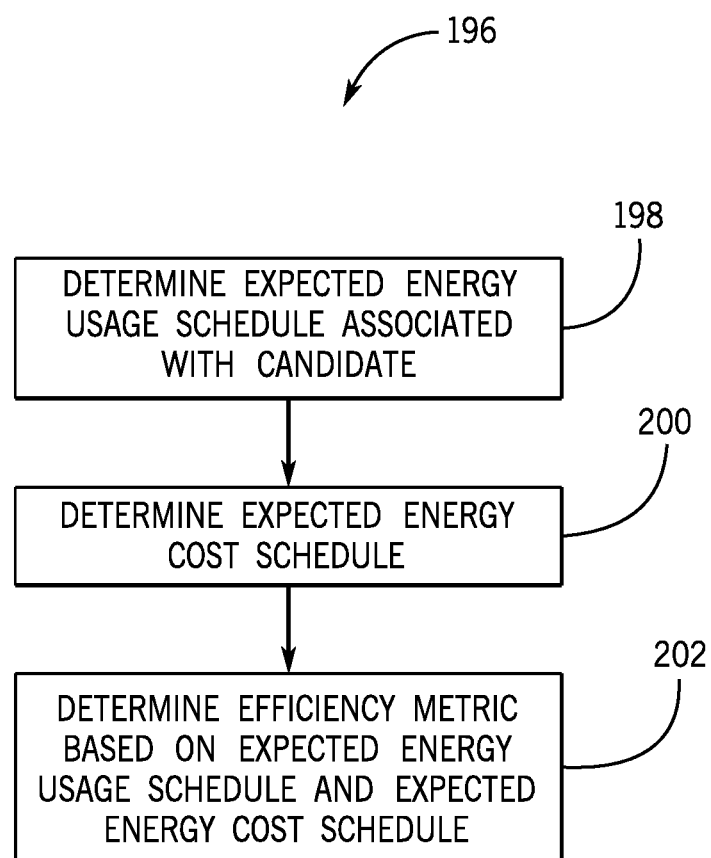
FIG. 10 is a flow diagram of a process for determining an efficiency metric associated with a candidate air condition schedule, in accordance with an embodiment of the present disclosure.

To help illustrate, an example of a process 196 for determining an efficiency metric associated with a candidate air condition schedule is described in FIG. 10. Generally, the process 196 includes determining an expected energy usage schedule associated with a candidate air condition schedule (process block 198), determining an expected energy cost schedule (process block 200), and determining an efficiency metric associated with the candidate air condition schedule based on the expected energy usage schedule and the expected energy cost schedule (process block 202).

Although the process 196 is described in a particular order, which represents a particular embodiment, it should be noted that the process 196 may be performed in any suitable order. Additionally, other embodiments of the process 196 may omit process blocks and/or include suitable additional process blocks. Moreover, in some embodiments, the process 196 may be implemented at least in part by executing instructions stored in a tangible, non-transitory, computer-readable medium, such as memory 104, using processing circuitry, such as processor 102.

Accordingly, in some embodiments, a control system 100 implemented in an HVAC system 11 may determine an expected energy usage schedule associated with a candidate air condition schedule (process block 198). In some embodiments, the expected energy usage schedule may indicate energy usage expected to occur during each time step during a control horizon of the candidate air condition schedule and, thus, may be determined based at least in part on historical data 114 resulting from previous operation of the HVAC system 11 while deployed in a current building 10 and the expected future conditions 116, such as expected environmental conditions. As an illustrative example, as described above, a first candidate air condition schedule may have a temperature setpoint that is 85° F. between 8:00 AM-4:00 PM and that gradually decreases from 85° F. to 75° F. between 4:00-5:00 PM. Based at least in part on the historical performance data 114A taken when the environmental temperature was 80° F. and the environmental humidity level was 20%, a first expected energy usage schedule associated with the first candidate air condition schedule may indicate that expected energy usage during each time step between 8:00 AM-4:00 PM is approximately 0 kWh and expected energy usage during the time step between 4:00-5:00 PM is approximately 20 kWh when the excepted environmental temperature is 80° F. and the expected environmental humidity level is 20%.

In a similar manner, the control system 100 may determine expected energy usage schedules for other candidate air condition schedules under consideration. For example, when the excepted environmental temperature is 80° F. and the expected environmental humidity level is 20%, the control system 100 may determine a second expected energy usage schedule associated with the second candidate air condition schedule, which indicates that expected energy usage during each time step between 8:00 AM-4:00 PM is approximately 0 kWh and expected energy usage during the time step between 4:00-5:00 PM is approximately 30 kWh. Additionally, the control system 100 may determine a third expected energy usage schedule associated with the third candidate air condition schedule, which indicates that expected energy usage during the time step between 8:00-9:00 AM is approximately 20 kWh, expected energy usage during the time step between 9:00-10:00 AM is approximately 10 kWh, and expected energy usage during each time step between 10:00 AM-5:00 PM is approximately 0 kWh. Furthermore, the control system 100 may determine a fourth expected energy usage schedule associated with the fourth candidate air condition schedule, which indicates that expected energy usage during the time step between 8:00-9:00 AM is approximately 30 kWh and expected energy usage during each time step between 10:00 AM-5:00 PM is approximately 0 kWh.

In addition to the expected energy usage schedule associated with the candidate air condition schedule, the control system 100 may determine an expected energy cost schedule (process block 200). Generally, the expected energy cost schedule may associate an energy cost per unit of energy, which the HVAC system 11 is expected to be subject during a control horizon of the candidate air condition schedule, with each time step during the control horizon. For example, the expected energy cost schedule may indicate the energy cost per unit of energy expected during each hour from 8:00 AM-5:00 PM. As an illustrative example, the expected energy cost schedule for a first day may indicate that the energy cost per unit of energy is a value of one from 8:00-9:00 AM, a value of two from 9:00-10:00 AM, a value of three from 10:00-11:00 AM, a value of four from 11:00 AM-12:00 PM, a value of five from 12:00-1:00 PM, a value of six from 1:00-2:00 PM, a value of seven from 2:00-3:00 PM, a value of eight from 3:00-4:00 PM, and a value of nine from 4:00-5:00 PM.

Thus, in some embodiments, the control system 100 may receive the expected energy cost schedule from a utility provider, for example, via a communication network coupled between the control system 100 and a remote data source 134 or a server provided by the utility provider. In some embodiments, this may enable the utility provider to notify the HVAC system 11 of events, such as maintenance or load shedding, which may affect cost and/or availability of electrical energy. Additionally or alternatively, the expected energy cost schedule may be predetermined and stored in memory 104, for example, by a manufacturer of the HVAC equipment 124, a system integrator of the HVAC system 11, or an occupant of the building 10. Furthermore, in some embodiments, the energy cost per unit of energy may be indicated as a monetary price per kilowatt-hour of energy expected to be charged by a utility provider. Additionally or alternatively, the energy cost per unit of energy may be indicated as carbon footprint or carbon credits expected to be used to produce a kilowatt-hour of energy.

Based at least in part on the expected energy usage schedule and the expected energy cost schedule, the control system 100 may determine an efficiency metric associated with the candidate air condition schedule (process block 202). As described above, in some embodiments, the efficiency metric may be indicative of energy cost associated with implementing the candidate air condition schedule and, thus, operational efficiency expected to result. For example, the control system 100 may determine the efficiency metric by summing together a metric associated with each time step during the control horizon in which the metric associated with a time step may be determined by multiplying the expected energy usage associated with the time step and the expected energy cost associated with the time step.

As an illustrative example, for the first (e.g., current) day, a first efficiency metric associated with the first candidate air condition schedule may have a value of one-hundred eighty since between 4:00-5:00 PM resulting energy usage of the HVAC system 11 is expected to be 20 kWh and the energy cost has a value of nine. Additionally, for the first day, a second efficiency metric associated with the second candidate air condition schedule may have a value of two-hundred seventy since between 4:00-5:00 PM resulting energy usage of the HVAC system 11 is expected to be 30 kWh and the energy cost has a value of nine. Furthermore, for the first day, a third efficiency metric associated with the third candidate air condition schedule may have a value of forty since between 8:00-9:00 AM resulting energy usage of the HVAC system 11 is expected to be 20 kWh and the energy cost has a value of one and between 9:00-10:00 AM resulting energy usage of the HVAC system 11 is expected to be 10 kWh and the energy cost has a value of two. Moreover, for the first day, a fourth efficiency metric associated with the fourth candidate air condition schedule may have a value of thirty since between 8:00-9:00 AM resulting energy usage of the HVAC system 11 is expected to be 30 kWh and the energy cost has a value of one.

In some embodiments, the control system 100 may additionally or alternatively determine the efficiency metric based at least in part on other costs, such as life cycle cost, maintenance cost, and/or disturbance cost, expected to result from implementing the candidate air condition schedule. For example, operating an HVAC unit 12 in a higher conditioning stage and/or for longer durations may shorten expected life cycle of the HVAC unit 12 and/or increase expected maintenance frequency. Additionally, actuating the motor 94 and compressor 44 at a higher speed may cause additional vibration, which may perceivably propagate through the building 10. In other words, although each may achieve the target air conditions at the expected return time, the efficiency metric may be formulated such that different air condition schedules may result in different efficiency metrics to balancing various factors, such as energy usage cost, life cycle cost, maintenance cost, and/or disturbance cost.

In a similar manner, the control system 100 may determine an efficiency metric associated with other candidate air condition schedules under consideration. In fact, in some embodiments, the control system 100 may consider a candidate air condition schedule that includes at least a portion of the default air condition schedule 106. For example, when the default air condition schedule 106 has a constant 75° F. temperature setpoint, the control system 100 may consider a fifth candidate air condition schedule with a temperature setpoint that is 75° F. between 8:00 AM-5:00 PM.

Returning to the process 172 of FIG. 9, the control system 100 may select an adjusted air condition schedule 108 from the candidate air condition schedules based at least in part on their associated efficiency metrics (process block 186). For example, the control system 100 may select the candidate air condition schedule associated with the best (e.g., lowest)

efficiency metric to facilitate optimizing operational efficiency of the HVAC system 11. As an illustrative example, even though total expected energy usage is higher, the control system 100 may select the fourth candidate air condition schedule over the third candidate air condition schedule for the first (e.g., current) day since the efficiency metric associated with the fourth candidate air condition schedule is lower for that day.

However, as described above, energy usage costs may vary between different days or different control horizons. As an illustrative example, for a second day, the energy cost per unit of energy is a value of three from 8:00-9:00 AM, a value of one from 9:00-10:00 AM, a value of four from 10:00-11:00 AM, a value of six from 11:00 AM-12:00 PM, a value of seven from 12:00-1:00 PM, a value of nine from 1:00-2:00 PM, a value of nine from 2:00-3:00 PM, a value of nine from 3:00-4:00 PM, and a value of eight from 4:00-5:00 PM. Thus, for the second day, the first efficiency metric associated with the first candidate air condition schedule may have a value of one-hundred sixty since between 4:00-5:00 PM resulting energy usage of the HVAC system 11 is expected to be 20 kWh and the energy cost has a value of eight. Additionally, for the second day, the second efficiency metric associated with the second candidate air condition schedule may have a value of two-hundred forty since between 4:00-5:00 PM resulting energy usage of the HVAC system 11 is expected to be 30 kWh and the energy cost has a value of eight.

Furthermore, for the second day, the third efficiency metric associated with the third candidate air condition schedule may have a value of seventy since between 8:00-9:00 AM resulting energy usage of the HVAC system 11 is expected to be 20 kWh and the energy cost has a value of three and between 9:00-10:00 AM resulting energy usage of the HVAC system 11 is expected to be 10 kWh and the energy cost has a value of one. Moreover, for the second day, the fourth efficiency metric associated with the fourth candidate air condition schedule may have a value of ninety since between 8:00-9:00 AM resulting energy usage of the HVAC system 11 is expected to be 30 kWh and the energy cost has a value of three. Accordingly, the control system 100 may select the third candidate air condition schedule over the fourth candidate air condition schedule for the second (e.g., next) day since the efficiency metric associated with the third candidate air condition schedule is lower for that day.

Thus, in some embodiments, the control system 100 may periodically re-determine the efficiency metrics and select an adjusted air condition schedule 108 accordingly, for example, on a per day basis. In fact, in some embodiments, by selecting between the candidate air condition schedules, the control system 100 determine a target (e.g., optimal) setback temperature, for example, when each of the candidate air condition schedules is determined in accordance with a setback control scheme. For example, since the first candidate air condition schedule may be selected over the second candidate air condition schedule due to their associated efficiency metrics, the control system 100 may determine that a target setback temperature is 85° F.

At least in some instances, implementing the target setback temperature instead of the default air condition schedule 106 when the building 10 is unoccupied may facilitate reducing energy usage by the HVAC system 11 while minimally increasing likelihood that deviation from the default air condition schedule will be perceived by a potential occupant of the building 10. For example, when the target temperature indicated by the default air condition schedule 106 is 75° F., instead implementing a target setback temperature of 85° F. may facilitate reducing operating or runtime duration of an HVAC unit 12 and, thus, resulting energy usage. In this manner, an adjusted air condition schedule 108, which may be implemented to override at least a portion of the default air condition schedule, may be determined.

Returning to the process 158 of FIG. 8, when the building 10 is unoccupied, the control system 100 may control operation of HVAC equipment 124 implemented in the HVAC system 11 using the adjusted air condition schedule 108 (process block 168). As described above, the control system 100 may control operation of the HVAC equipment 124 (e.g., climate control equipment) based at least in part on deviation between measured air conditions and target air conditions. For example, when measured temperature is greater than the target temperature indicated by the adjusted air condition schedule 108 by more than a first threshold amount, the control system 100 may output a first control signal that instructs an HVAC unit 12 to turn on and/or to switch from a stage-one conditioning mode to a stage-two conditioning mode. Additionally, when difference between the measure temperature and the target temperature is less than a second threshold, the control system 100 may output a second control signal that instructs an HVAC unit 12 to turn off and/or to switch from the stage-two conditioning mode to the stage-one conditioning mode.

To facilitate controlling operation of the HVAC system 11 during future control horizons, the control system 100 may determine performance data resulting from operation of the HVAC equipment 124 (process block 170). In particular, as described above, the performance data may be stored as historical performance data 114A, for example, in memory 104. Additionally, in some embodiments, the performance data associated with a period of time may indicate environmental air conditions during the period of time, temperature change within the building 10 during the period of time, equipment mode of HVAC equipment 124 during the period of time, and energy usage of the HVAC equipment 124 during the period of time. Thus, in some embodiments, the control system 100 may determine the performance data resulting from operation of the HVAC equipment 124 based at least in part on sensor data 112 received from one or more sensor 99 and/or operational parameters of the HVAC equipment 124, for example, determined by the control system 100 and/or included in equipment information 110 received from the HVAC equipment 124.

Moreover, the control system 100 may determine occupancy data indicative of occupancy status of the building 10 over at least a portion of the control horizon of the air condition schedule implemented by the HVAC system 11 (process block 171). In particular, as described above, the occupancy data may be stored as historical occupancy data 114B, for example, in memory 104. Thus, in some embodiments, the control system 100 may determine occupancy data based at least in part on sensor data 112 received from one or more occupancy sensors 99 deployed in or around the building 10. Additionally or alternatively, the control system 100 may determine occupancy data based at least in part on location data received from a global positioning system (GPS), for example, implemented in a potential occupant's mobile device 132.

The specific embodiments described above have been shown by way of example. It should be understood that these embodiments may be susceptible to various modifications and/or alternative forms. It should be further understood that the claims are not intended to be limited to the particular forms disclosed, but rather to cover all modifications, equivalents, and alternatives falling within the spirit and scope of the present disclosure.

What is claimed is:

1. A heating, ventilation, and air conditioning (HVAC) system, comprising:
a control system communicatively coupled to HVAC equipment and configured to operate the HVAC equipment based on feedback received from a temperature sensor indicative of a temperature within a building serviced by the HVAC equipment, wherein the control system is programmed to:
control operation of the HVAC equipment based on a first temperature schedule comprising a first temperature setpoint when the building is occupied; and
when the building is not occupied:
determine an expected return time of an occupant to the building based at least in part on historical occupancy data associated with the building; and
control operation of the HV AC equipment based on a second temperature schedule expected to result in the temperature within the building reaching the first temperature setpoint when the expected return time is reached, wherein the second temperature schedule is selected from a plurality of candidate schedules based on an efficiency metric of the second temperature schedule, wherein the efficiency metric is based on energy usage of the HVAC equipment indicated by historical performance data stored in a memory of the control system and resulting from previous operation of the HVAC system, and wherein the historical performance data comprises HVAC equipment operating duration information, HVAC equipment operating mode information, environmental conditions, air conditions within the building, or a combination thereof associated with previous operation of the HVAC system.

2. The HVAC system of claim 1, wherein the control system is programmed to:
determine the plurality of candidate schedules, wherein each candidate schedule of the plurality of candidate schedules is expected to result in the temperature within the building meeting the first temperature setpoint when the expected return time is reached, and wherein the plurality of candidate schedules comprises the second temperature schedule;
determine a plurality of efficiency metrics, wherein each efficiency metric of the plurality of efficiency metrics is associated with a respective candidate schedule of the plurality of candidate schedules, and each efficiency metric of the plurality of efficiency metrics is based on the energy usage of the HVAC equipment indicated by the historical performance data stored in the memory of the control system and resulting from previous operation of the HVAC system; and
select the second temperature schedule from the plurality of candidate schedules based on the plurality of efficiency metrics.

3. The HVAC system of claim 1, wherein the control system is programmed to:
determine environmental conditions expected to be present outside the building during a time period from a current time to the expected return time; and
select the second temperature schedule from the plurality of candidate schedules based on the efficiency metric of the second temperature schedule, wherein the efficiency metric is based on previous environmental conditions associated with the energy usage of the HVAC equipment indicated by the historical performance data.

4. The HVAC system of claim 3, wherein the second temperature schedule is a first candidate schedule of the plurality of candidate schedules, and wherein the control system is programmed to:
determine a first energy usage schedule expected to result from implementation of the first candidate schedule of the plurality of candidate schedules and a second energy usage schedule expected result from implementation of a second candidate schedule of the plurality of candidate schedules based at least in part on the environmental conditions expected to be present outside the building during the time period, the energy usage of the HVAC equipment indicated by the historical performance data, the previous environmental conditions associated with the energy usage of the HVAC equipment indicated by the historical performance data, and the temperature within the building measured at the current time by the temperature sensor; and
determine an energy cost schedule that associates a cost metric with each time step during the time period.

5. The HVAC system of claim 4, wherein the efficiency metric is a first efficiency metric, and wherein the control system is programmed to:
determine the first efficiency metric of the first candidate schedule based at least in part on the cost metric associated with each time step during the time period by the energy cost schedule and a first expected energy usage associated with each time step during the time period by the first energy usage schedule; and
determine a second efficiency metric of the second candidate schedule based at least in part on the cost metric associated with each time step during the time period by the energy cost schedule and a second expected energy usage associated with each time step during the time period by the second energy usage schedule.

6. The HVAC system of claim 4, wherein the cost metric is indicative of carbon footprint resulting from production of a unit of energy, consumption of the unit of energy, or both.

7. The HVAC system of claim 3, wherein the control system comprises a network interface configured to communicatively couple the control system to a communication network, and the control system is configured to determine the environmental conditions expected to be present outside the building during the time period based at least in part on weather data received from a remote data source via the communication network.

8. The HVAC system of claim 3, comprising an outdoor temperature sensor communicatively coupled to the control system and configured to measure outside air temperature proximate the building, wherein the control system is configured to determine the environmental conditions expected to be present outside the building during the time period based at least in part on the outside air temperature measured by the outdoor temperature sensor.

9. A tangible, non-transitory, computer-readable medium, comprising computer-readable instructions executable by at least one processor of a control system in a heating, ventilation, and/or air conditioning (HVAC) system that, when executed by the at least one processor, cause the at least one processor to:
determine, using the at least one processor, occupancy status of a building serviced by the HVAC system;

when the building is occupied, control, using the at least one processor, operation of HVAC equipment based on a first temperature schedule to supply conditioned air to the building; and when the building is not occupied:
   determine, using the at least one processor, an expected return time of an occupant to the building based at least in part on historical occupancy data associated with the building;
   determine, using the at least one processor, a target temperature expected to be present in the building at the expected return time; and
   control operation of the HVAC equipment based on a second temperature schedule expected to result in an indoor temperature within the building reaching the target temperature when the expected return time is reached, wherein the second temperature schedule is selected from a plurality of candidate schedules based on an efficiency metric of the second temperature schedule, wherein the efficiency metric is based on energy usage of the HVAC equipment indicated by historical performance data stored on the computer-readable medium, and wherein the historical performance data comprises HVAC equipment operating duration information, HVAC equipment operating mode information, environmental conditions, air conditions within the building, or a combination thereof associated with previous operation of the HVAC system.

10. The computer-readable medium of claim 9, wherein the historical performance data comprises the environmental conditions associated with previous operation of the HVAC system, and the environmental conditions comprise environmental air information associated with previous operation of the HVAC system.

11. The computer-readable medium of claim 9, wherein the first temperature schedule comprises a respective temperature setpoint associated with each time step during the first temperature schedule, and wherein the computer-readable instructions, when executed by the at least one processor, cause the at least one processor to determine the target temperature expected to be present in the building at the expected return time by determining the respective temperature setpoint associated with the expected return time by the first temperature schedule.

12. The computer-readable medium of claim 9, wherein the computer-readable instructions, when executed by the at least one processor, cause the at least one processor to:
   determine, using the at least one processor, a plurality of candidate schedules, wherein each candidate schedule of the plurality of candidate schedules is expected to result in the indoor temperature within the building reaching the target temperature when the expected return time is reached, wherein the plurality of candidate schedules comprises the second temperature schedule;
   determine, using the at least one processor, a plurality of efficiency metrics, wherein each efficiency metric of the plurality of efficiency metrics is associated with one of the plurality of candidate schedules, each efficiency metric of the plurality of efficiency metrics is based on the energy usage of the HVAC equipment indicated by the historical performance data stored on the computer-readable medium, and the plurality of efficiency metrics comprises the efficiency metric of the second temperature schedule; and
   select the second temperature schedule from the plurality of candidate schedules based on the plurality of efficiency metrics.

13. The computer-readable medium of claim 12, wherein the computer-readable instructions, when executed by the at least one processor, cause the at least one processor to:
   determine a first candidate schedule of the plurality of candidate schedules that associates each time step during a control horizon from a current time to the expected return time with a first temperature setpoint that is a constant first value during a first portion of the control horizon and ramps from the constant first value to the target temperature expected to be present at the expected return time during a second portion of the control horizon; and
   determine a second candidate schedule of the plurality of candidate schedules that associates each time step during the control horizon from the current time to the expected return time with a second temperature setpoint that is a constant second value different from the constant first value during the first portion of the control horizon and ramps from the constant second value to the target temperature expected to be present at the expected return time during a third portion of the control horizon.

14. The computer-readable medium of claim 12, wherein the computer-readable instructions, when executed by the at least one processor, cause the at least one processor to:
   determine the plurality of efficiency metrics based on the environmental conditions associated with previous operation of the HVAC system; and
   select the second temperature schedule from the plurality of candidate schedules based on environmental conditions expected from a current time to the expected return time.

15. The computer-readable medium of claim 14, wherein the computer- readable instructions, when executed by the at least one processor, cause the at least one processor to determine the environmental conditions expected from the current time to the expected return time are based on weather data received from a remote data source, feedback received from an outdoor sensor of the HVAC system disposed proximate the building, or both.

16. A heating, ventilation, and air conditioning (HVAC) system, comprising:
   HVAC equipment configured to supply conditioned air to a building; and
   a control system communicatively coupled to the HVAC equipment and configured to operate the HVAC equipment based on feedback received from a temperature sensor indicative of a temperature within the building serviced by the HVAC equipment, wherein the control system comprises:
      a memory device configured to store historical performance data of the HVAC system resulting from previous operation of the HVAC system, wherein the historical performance data comprises energy usage data from previous operation of the HVAC equipment; and
      processing circuitry communicatively coupled to the memory device, wherein the processing circuitry is programmed to:
         control operation of the HVAC equipment based on a first temperature schedule during a first control horizon to supply conditioned air to the building; and when the building is not occupied during a second control horizon after the first control horizon:
determine an expected return time of an occupant to the building; and
control operation of the HVAC equipment based on a second temperature schedule expected to result in the temperature within the building meeting a target temperature setpoint at the expected return time, wherein the second temperature schedule is selected from a plurality of candidate schedules, wherein each candidate schedule of the plurality of candidate schedules is associated with a respective efficiency metric that is based on the energy usage data from previous operation of the HVAC equipment, and wherein the second temperature schedule is selected based on the respective efficiency metric of the second temperature schedule.

17. The HVAC system of claim 16, wherein the processing circuitry is programmed to receive the energy usage data from a sensor of the HVAC system.

18. The HVAC system of claim 16, wherein the historical performance data comprises previous environmental conditions, previous operational parameters of the HVAC system, and resulting change in the temperature within the building during previous operation of the HVAC system.

19. The HVAC system of claim 18, wherein the processing circuitry is programmed to:
determine the plurality of candidate schedules;
determine the efficiency metrics associated with the plurality of candidate schedules based on the historical performance data and environmental conditions expected during the second control horizon; and
select the second temperature schedule based on a comparison of the efficiency metrics.

20. The HVAC system of claim 16, wherein the processing circuitry is programmed to determine the expected return time of the occupant to the building based on occupancy status of the building during the first control horizon, based on location data received from a global positioning system (GPS), or both.

* * * * *